(12) United States Patent
Heo et al.

(10) Patent No.: US 10,309,525 B2
(45) Date of Patent: Jun. 4, 2019

(54) VEHICLE TRANSMISSION HAVING DIAL TYPE GEAR SHIFT

(71) Applicant: SL Corporation, Daegu (KR)

(72) Inventors: Chun Nyung Heo, Daegu (KR); Hong Jun Cha, Daegu (KR); Dae Hyung Kim, Daegu (KR)

(73) Assignee: SL Corporation, Daegu (KR)

( * ) Notice: Subject to any disclaimer, the term of this patent is extended or adjusted under 35 U.S.C. 154(b) by 331 days.

(21) Appl. No.: 15/094,196

(22) Filed: Apr. 8, 2016

(65) Prior Publication Data

US 2016/0312882 A1 Oct. 27, 2016

(30) Foreign Application Priority Data

Apr. 22, 2015 (KR) .................. 10-2015-0056664
Apr. 29, 2015 (KR) .................. 10-2015-0060810
Apr. 29, 2015 (KR) .................. 10-2015-0060897

(51) Int. Cl.

| F16H 59/02 | (2006.01) |
|---|---|
| F16H 59/08 | (2006.01) |
| F16H 61/24 | (2006.01) |
| F16H 61/22 | (2006.01) |
| F16H 63/42 | (2006.01) |

(52) U.S. Cl.
CPC ............ *F16H 59/08* (2013.01); *F16H 61/22* (2013.01); *F16H 61/24* (2013.01); *F16H 2059/0295* (2013.01); *F16H 2059/081* (2013.01); *F16H 2061/247* (2013.01); *F16H 2063/423* (2013.01)

(58) Field of Classification Search
CPC ................................................ F16H 2059/081
See application file for complete search history.

(56) References Cited

U.S. PATENT DOCUMENTS

| 2,183,485 | A | * | 12/1939 | Butzbach | ............ | F16H 61/0293 |
|---|---|---|---|---|---|---|
| | | | | | | 184/6.12 |
| 3,901,097 | A | * | 8/1975 | Williams | ............... | B60K 37/06 |
| | | | | | | 116/DIG. 20 |
| 5,094,115 | A | * | 3/1992 | Michihira | ............... | B60K 37/06 |
| | | | | | | 475/7 |
| 7,009,479 | B1 | * | 3/2006 | Chung | .................. | B60R 25/021 |
| | | | | | | 335/229 |
| 7,834,865 | B2 | * | 11/2010 | Jannasch | .................. | G05G 1/10 |
| | | | | | | 200/564 |

(Continued)

FOREIGN PATENT DOCUMENTS

DE  10 2004 049 011 A1  4/2006
DE  10 2012 219 803 A1  4/2014

(Continued)

*Primary Examiner* — William Kelleher
*Assistant Examiner* — Gregory T Prather
(74) *Attorney, Agent, or Firm* — Mintz Levin Cohn Ferris Glovsky and Popeo, P.C.; Kongsik Kim; Jhongwoo Jay Peck

(57) ABSTRACT

A vehicle transmission is provided that performs a dial type gear shift operation. The vehicle transmission includes a knob that rotates to select a shaft stage and an operation unit that rotates to generate the operation feeling when the knob rotates. Additionally, a plurality of gear units are configured to transmit the rotational force of the knob to the operation unit and at least one of the plurality of gear units has a central axis spaced apart from the rotational axis of the knob.

20 Claims, 32 Drawing Sheets

(56) References Cited

U.S. PATENT DOCUMENTS

| | | | |
|---|---|---|---|
| 2006/0037424 A1* | 2/2006 | Pickering | B60K 37/06 74/473.3 |
| 2009/0000407 A1* | 1/2009 | Meyer | B60K 37/06 74/10.1 |
| 2013/0313086 A1* | 11/2013 | Redwood | F16H 59/02 200/61.88 |
| 2015/0152958 A1* | 6/2015 | Watanabe | F16H 59/08 74/473.12 |
| 2015/0167827 A1* | 6/2015 | Fett | F16H 59/08 74/473.3 |
| 2015/0369358 A1* | 12/2015 | Lee | F16H 59/08 74/507 |
| 2016/0017983 A1* | 1/2016 | Levesque | F16H 59/0204 74/473.25 |
| 2016/0138704 A1* | 5/2016 | Watanabe | F16H 59/08 74/473.23 |
| 2016/0245396 A1* | 8/2016 | Behounek | F16H 59/08 |
| 2016/0348783 A1* | 12/2016 | Shinkai | F16H 61/32 |
| 2017/0175883 A1* | 6/2017 | Watanabe | F16H 59/08 |
| 2017/0175884 A1* | 6/2017 | Watanabe | F16H 59/08 |
| 2017/0175888 A1* | 6/2017 | Jeon | F16H 19/02 |
| 2018/0038478 A1* | 2/2018 | Arakawa | B60K 20/02 |

FOREIGN PATENT DOCUMENTS

| | | |
|---|---|---|
| EP | 1 229 272 A2 | 8/2002 |
| EP | 1 736 845 A1 | 12/2006 |
| EP | 2 626 588 A1 | 8/2013 |
| JP | 09065637 | 8/1995 |
| JP | 11-306917 | 9/2003 |
| JP | 2008-153121 A | 7/2008 |
| KR | 2000-0031472 A | 6/2000 |
| KR | 10-2010-0090826 | 2/2009 |
| KR | 10-2010-0138521 | 6/2009 |
| KR | 10-0968462 | 7/2010 |
| KR | 10-2013-0103311 | 4/2011 |
| KR | 10-2013-0088526 | 1/2012 |
| KR | 10-1419700 B1 | 7/2014 |
| WO | 2007/003394 A1 | 1/2007 |
| WO | 2013/123375 A2 | 8/2013 |
| WO | 2014/142377 A1 | 9/2014 |

* cited by examiner

| POSITION | POWER SUPPLY | OPERATING STATUS OF DRIVE UNIT |
|---|---|---|
| INITIAL POSITION | 0 |  |
| POSITION SWITCHING | +V |  |
| MAINTENANCE OF SWITCHED POSITION | 0 |  |
| RESTORATION TO INITIAL POSITION | −V |  |

VEHICLE TRANSMISSION HAVING DIAL TYPE GEAR SHIFT

CROSS REFERENCE TO RELATED APPLICATIONS

This application claims priority to Korean Patent Application No. 10-2015-0056664 filed on Apr. 22, 2015, Korean Patent Application No. 10-2015-0060810 filed on Apr. 29, 2015, and Korean Patent Application No. 10-2015-0060897 filed on Apr. 29, 2015, which applications are incorporated herein by reference.

TECHNICAL FIELD

The present invention relates to a vehicle transmission, and more particularly, to a vehicle transmission that performs a dial type gear shift operation.

BACKGROUND ART

Generally, transmissions may change a gear ratio to maintain the constant turning of an engine based on the speed of the vehicle, and a driver may operate a shift lever to change the gear ratio of the transmission. A gear shift mode of the transmission includes a manual gear shift mode in which the driver may change a shift stage, and an automatic gear shift mode in which the shift stage automatically changes based on the speed of the vehicle when the driver selects a driving stage (D).

Further, sports mode type transmissions capable of performing the manual gear shift and the automatic gear shift in a single transmission are used. In the sports mode type transmission, a transmission capable of performing the manual gear shift may be disposed proximate to a transmission that performs the automatic gear shift to allow the driver to perform the manual gear shift by increasing or decreasing the number of gear stages, while performing the automatic gear shift.

The shift lever is exposed to the interior of the vehicle to be operated by the driver, and many the shift levers in the related art are disposed between a center fascia and a console box of the vehicle. In general, since the driver selects the shift stage by moving the shift lever, a space is formed along a locus of movement of the shift lever. Thus, a design is required to prevent an occurrence of interference with the surrounding. Thus, recently, methods for allowing the dial type gear shift operation to reduce the space required for the gear shift operation, increase the spatial utilization of the vehicle and improve the gear shift operability have been researched.

SUMMARY

Aspects of the present invention provide a vehicle transmission that may improve the use of the interior space of the vehicle by applying a dial type gear shift, while achieving a high gear ratio, by allowing a gear unit that rotates about the same axis as a rotational axis of a knob and a gear unit that rotates about an axis different from the rotational axis of the knob to turn when meshing with each other. However, aspects of the present invention are not restrained to the one set forth herein. The above and other aspects of the present invention that have not been mentioned will become more apparent to one of ordinary skill in the art to which the present invention pertains by referencing the detailed description of the present invention given below.

According to an aspect of the present invention, a vehicle transmission may include a knob configured to rotate to select a shaft stage; an operation unit configured to rotate to generate a feeling of an operation when the knob rotates; and a plurality of gear units configured to transmit the rotational force of the knob to the operation unit. At least one of the plurality of the gear units may have a central axis spaced apart from the rotational axis of the knob. Other specific matters of the present invention are included in the detailed description and drawings.

According to the vehicle transmission of the present invention as described above, there are one or more of following effects.

The spatial utilization of the interior of the vehicle may be enhanced, by using the dial type gear shift operation, and a high gear ratio may be achieved even without using a gear unit having a substantial diameter difference, thereby obtaining a sufficient reduction effect, while allowing the decreased overall size, since the gear unit configured to rotate about the same axis as a rotational axis of a knob and the gear unit configured to rotate about an axis different from the rotational axis of the knob turn when meshing with each other.

Effects of the present invention are not limited to the aforementioned effects, and other effects that have not been mentioned will be clearly understood by those skilled in the art from the scope of the claims.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
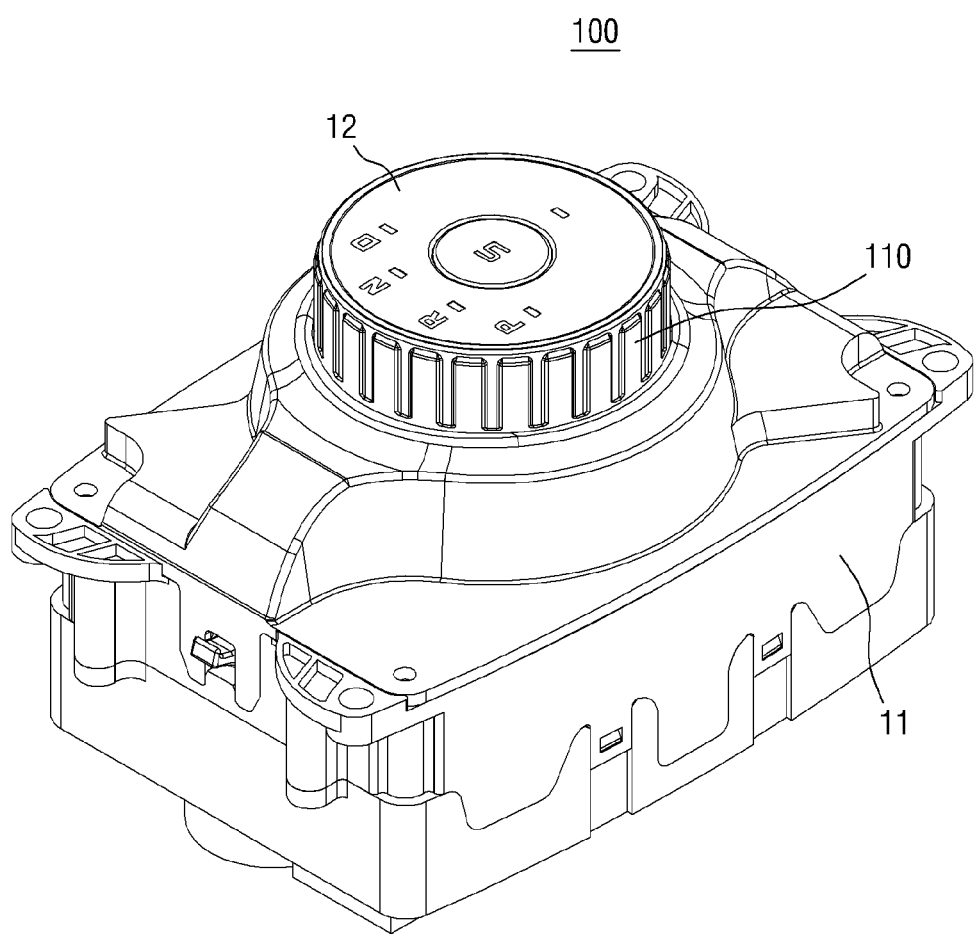
FIG. 1 is a perspective view illustrating an external appearance of a vehicle transmission according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present invention and methods of accomplishing the same will become more apparent with reference to exemplary embodiments to be described in detail in conjunction with the accompanying drawings. However, the present invention may be embodied in many different forms rather than being limited to the exemplary embodiments set forth herein, the present exemplary embodiments are simply provided to make the disclosure of the present invention complete and to fully convey the concept of the present invention to those skilled in the art, and the present invention are only defined by the categories of claims. The same reference numerals throughout the specification refer to the same components. Thus, in some exemplary embodiments, well-known processing steps, well-known structures and well-known techniques will not be specifically explained in order to avoid ambiguous interpretation of the present invention.

Further, the exemplary embodiments described herein will be described with reference to the cross-sectional views and/or the schematic views that are ideal exemplary views of the present invention. Accordingly, the forms of the exemplary views may be modified by manufacturing techniques and/or tolerances. Accordingly, the exemplary embodiments of the present invention also include changes in forms generated according to the manufacturing process rather than being limited to the illustrated specific forms. Moreover, each component in the respective drawings illustrated in the present invention may be illustrated in a slightly enlarged or reduced manner in consideration of convenience of explanation. The same reference numerals throughout the specification refer to the same components.

Hereinafter, the present invention will be described with reference to the drawings for explaining a vehicle transmission by the embodiments of the present invention.

FIG. 1 is a perspective view illustrating an external appearance of the vehicle transmission according to an exemplary embodiment of the present invention. Referring to FIG. 1, a vehicle transmission 100 according to the exemplary embodiment of the present invention may include a knob 110 exposed to one side of a case 11 to allow a driver to rotate the knob 110 and select a desired shift stage.

Although many vehicle transmissions 100 are disposed between a center facia and a console box of the vehicle to allow a gear shift operation by the driver, the vehicle transmission 100 may be installed at various locations within the vehicle to which the accessibility of the driver is high, without being limited thereto. Further, in the exemplary embodiment of the present invention, the knob 110 of the vehicle transmission 100 may exposed to the interior of the vehicle, and the case 11 that houses or accommodates various components necessary for the gear shift function and the shift lock function may be mounted within the vehicle body to decrease the space occupied by the vehicle transmission 100 inside the vehicle, thereby improving the spatial utilization of the vehicle interior.

Further, the knob 110 may include a display device 12 configured to display a plurality of selectable shift stages, the currently selected shift stage and the like. Although the exemplary embodiment of the present invention illustrates the position of the display device 12 fixed and an outer surface of the knob 110 capable of rotating to select the shift stage as an example, the knob 110 and the display device 12 may be rotated together without being limited thereto.

Figure 2:
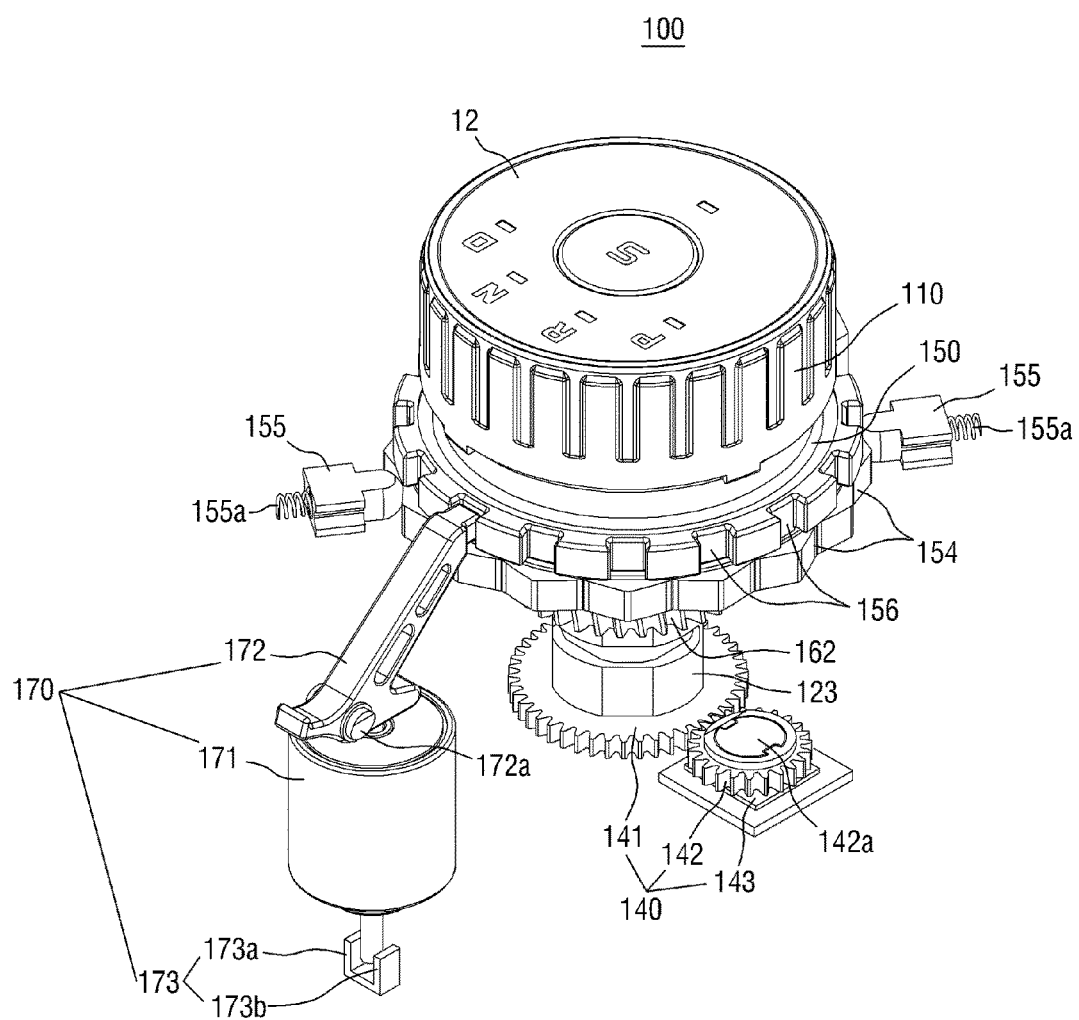
FIGS. 2 and 3 are perspective views illustrating the vehicle transmission according to an exemplary embodiment of the present invention.
Figure 3:
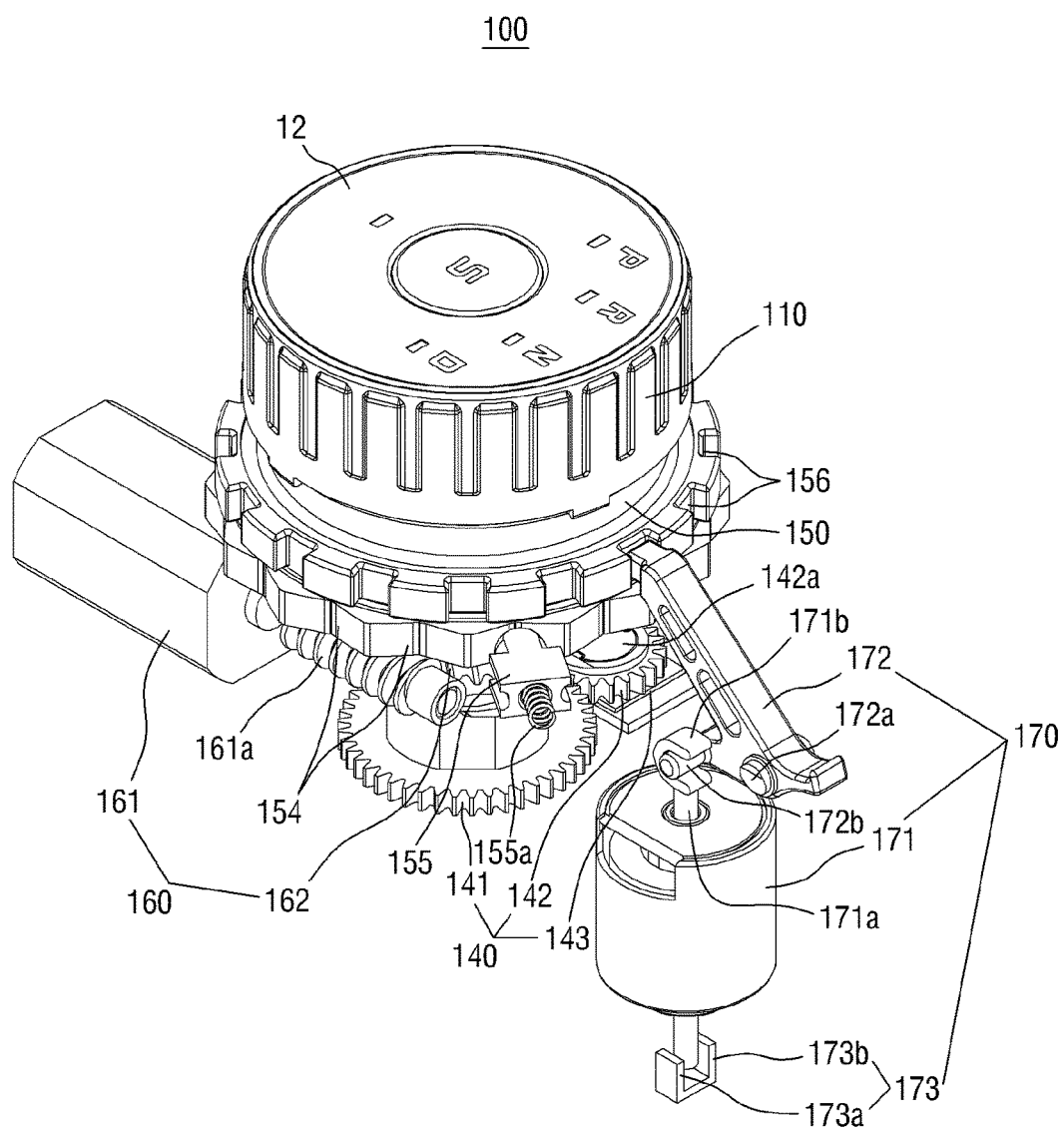
Figure 4:
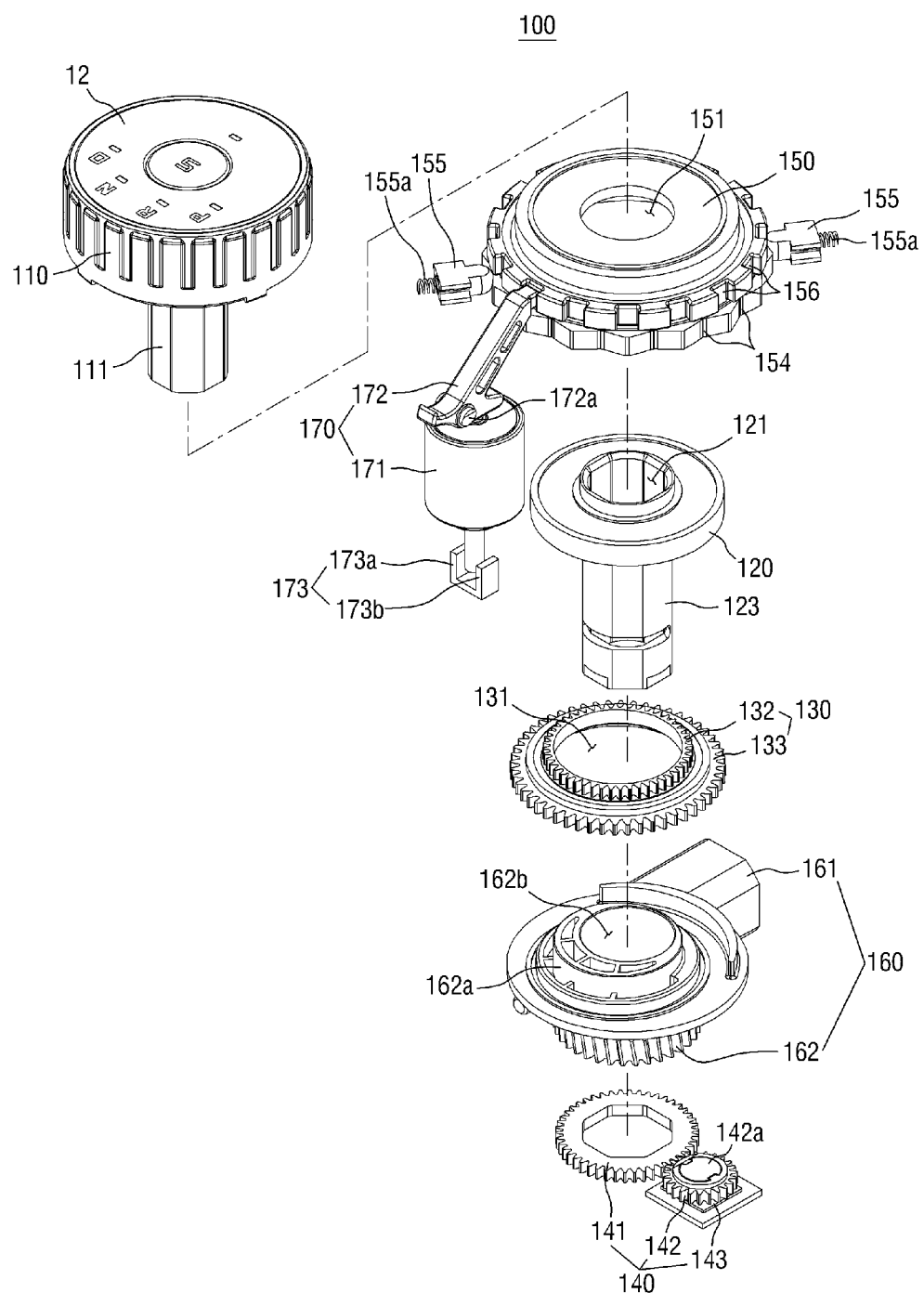
FIG. 4 is a detailed view illustrating the vehicle transmission according to the exemplary embodiment of the present invention.
Figure 5:
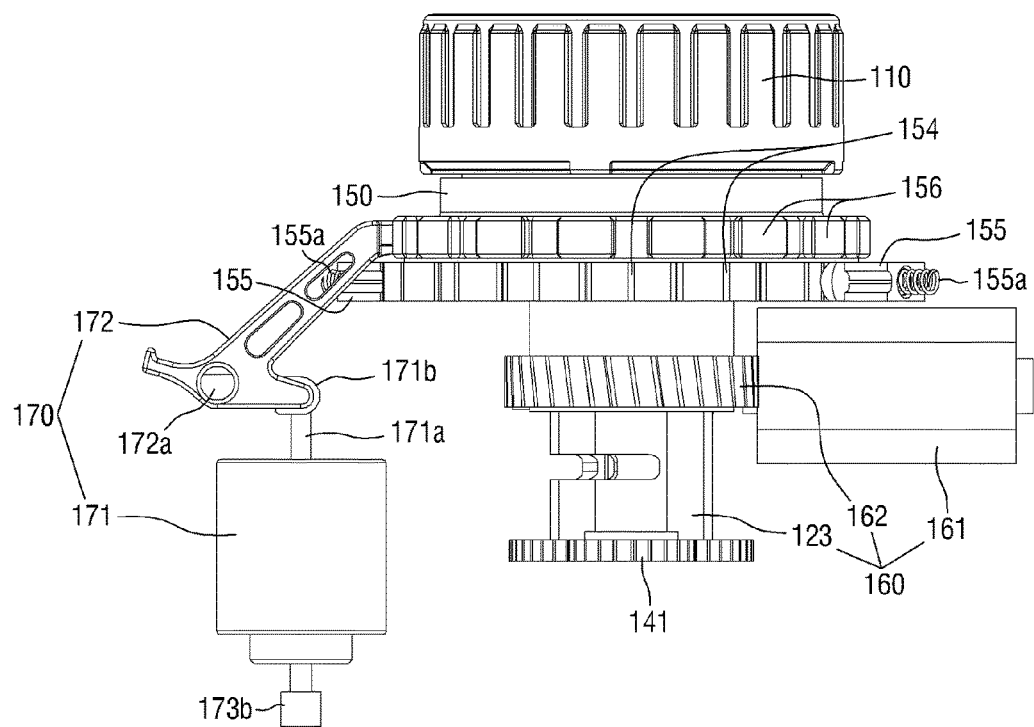
FIG. 5 is a side view illustrating the vehicle transmission according to the exemplary embodiment of the present invention.
Figure 6:
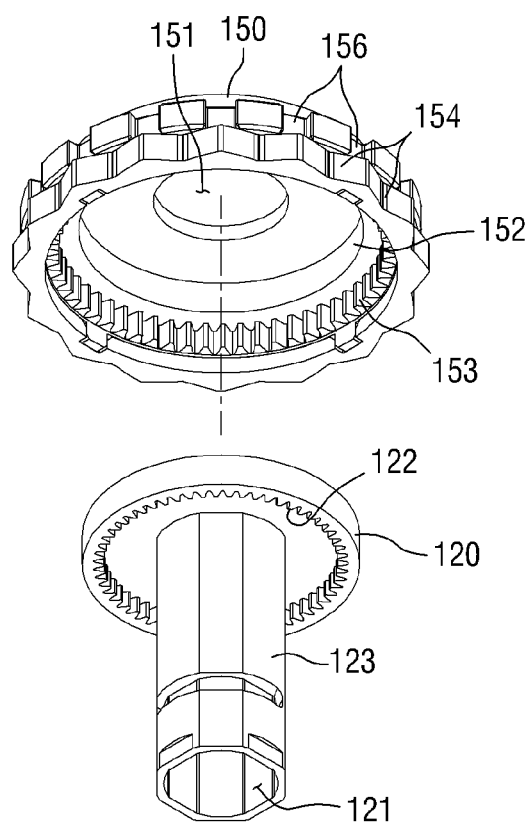
FIG. 6 is a detailed view illustrating an operation unit and a first gear unit according to the exemplary embodiment of the present invention.
Figure 7:
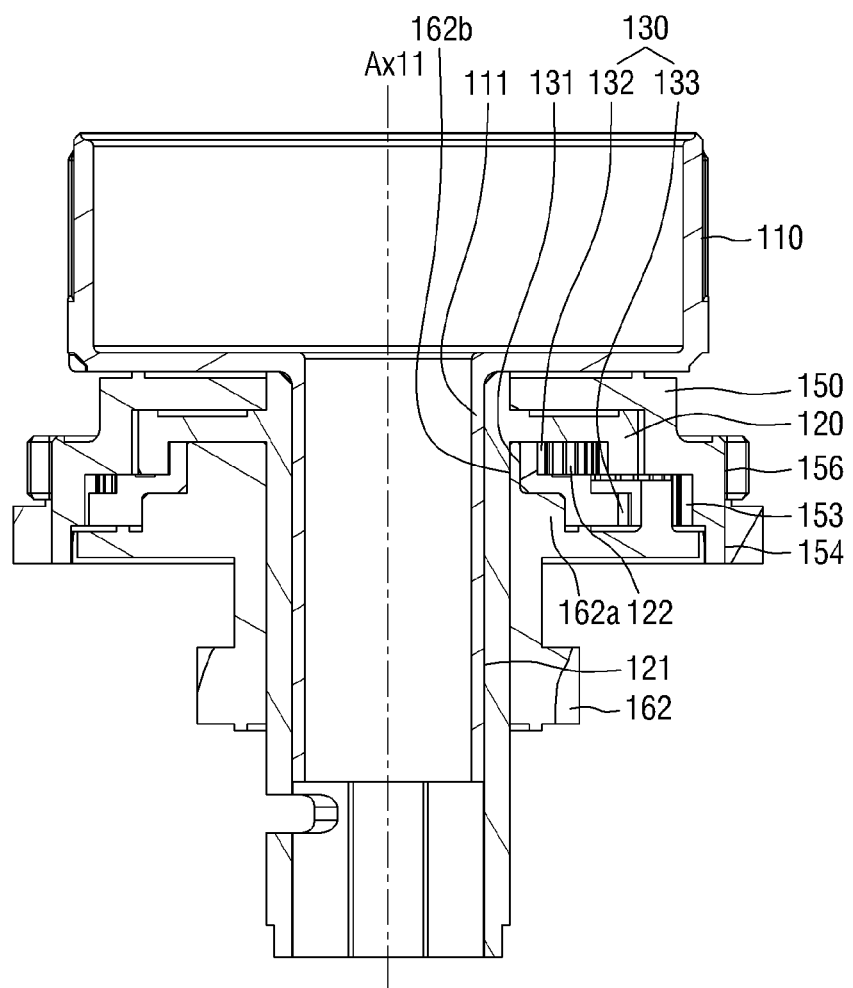
FIGS. 7 to 10 are cross-sectional views illustrating the vehicle transmission according to the exemplary embodiment of the present invention.
Figure 8:
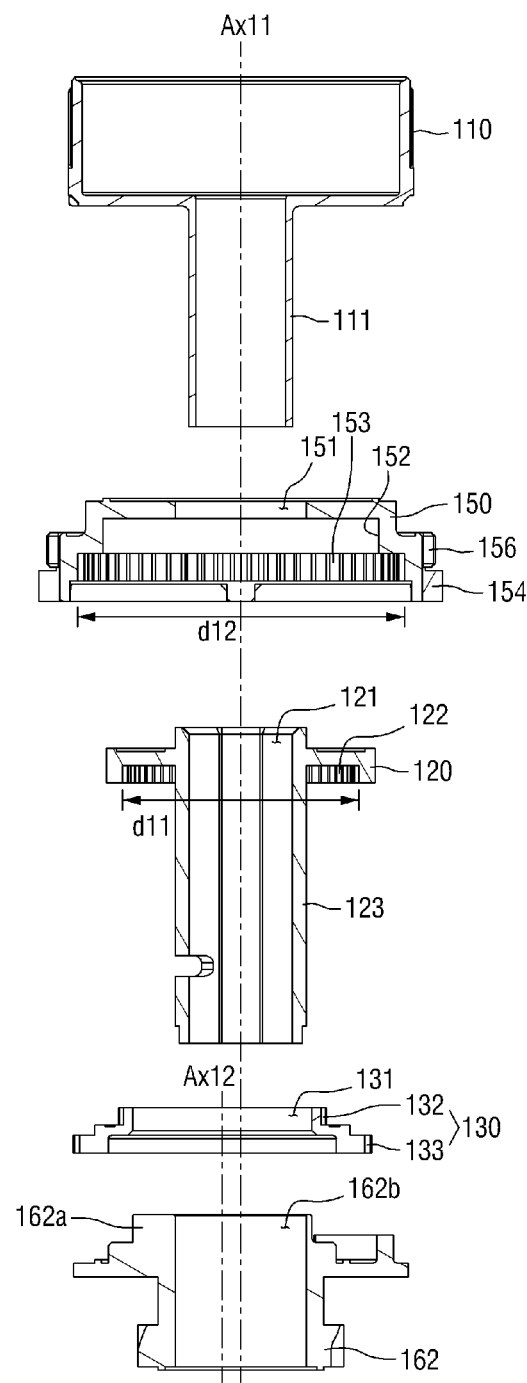

FIGS. 2 and 3 are perspective views illustrating the vehicle transmission according to an exemplary embodiment of the present invention, FIG. 4 is a detailed view illustrating the vehicle transmission according to the exemplary embodiment of the present invention, FIG. 5 is a side view illustrating the vehicle transmission according to the exemplary embodiment of the present invention, FIG. 6 is an exploded perspective view illustrating an operation unit and a first gear unit according to the exemplary embodiment of the present invention, and FIGS. 7 to 10 are cross-sectional views illustrating the vehicle transmission according to the exemplary embodiment of the present invention.

Referring to FIGS. 2 through 8, the vehicle transmission 100 according to the exemplary embodiment of the present invention may include a knob 110, a plurality of the gear units 120 and 130, a detection unit 140 (e.g., a sensor), an operation unit 150, a restoring unit 160 and a locking unit 170. The various units of the vehicle transmission 100 may be operated by a controller having a processor and a memory. The knob 110 may allow the shift stage to be selected by rotating in at least one direction when the external force is applied by the driver, and in the exemplary embodiment of the present invention, the knob 110 may be disposed on one side (e.g., an upper side) of the operation unit 150 to allow a shaft 111 to be inserted into a cavity 151 of the operation unit 150 configured to rotate to generate an operation feeling during rotation of the knob 110. Hereinafter, a "gear unit" may refer to a component in which one or more gear having a plurality of gear teeth is formed.

In particular, the location of the knob 110 may also include being proximate to one side (e.g., a first side) of the operation unit 150 as well as adjacent to the one side of the operation unit 150. The plurality of gear units 120 and 130 may be configured to transmit the rotational force in both directions, such as transmitting the rotational force caused by the rotation of the knob 110 to the operation unit 150 to allow the operation unit 150 to rotate, or transmitting the rotational force generated from a restoring unit 160 to be described later to the knob 110 to allow the knob 110 to rotate.

Additionally, the plurality of gears units 120 and 130 will be referred to as each of a first gear unit 120 and a second gear unit 130. The first gear unit 120 may be formed with a cavity 121 into which the shaft 111 of the knob 110 may be inserted through the cavity 151 of the operation unit 150, and the first gear unit 120 may be formed with a first internal gear 122 along an outer end thereof. The first gear unit 120 may be inserted into an insertion groove 152 formed on the other side (e.g., a lower side) of the operation unit 150 and may be disposed on the lower side of the operation unit 150, and the operation unit 150 and the first gear unit 120 may be configured to rotate about a rotational axis AX11 of the knob 110.

In particular, the location of the first gear unit 120 may include being disposed proximate to the other side of the operation unit 150 as well as adjacent to the other side (e.g., a second side) of the operation unit 150, similarly to the aforementioned knob 110.

The positions of each of the cavity 151 of the operation unit 150 and the cavity 121 of the first gear unit 120 may be aligned to allow the shaft 111 of the knob 110 to be inserted there through. Thus, the first gear unit 120 may be configured to rotate when the knob 110 rotates. Additionally, the knob 110 may be configured to rotate when the first gear unit 120 rotates, and thus, the mutual rotation force may be transmitted. The second gear unit 130 may be disposed on the lower side of the first gear unit 120 and may be formed with a cavity 131 into which a shaft 123 that extends in one direction from the cavity 121 of the first gear unit 120 may be inserted. The second gear unit 130 may include a first external gear 132 meshing with the a first side of the first internal gear 122, and a second external gear 133 that meshes with the a first side of the second internal gear 153 formed on the outer peripheral surface of the insertion groove 152 of the operation unit 150 to have a diameter d12 greater than a diameter d11 of the first internal gear 122.

Figure 9:
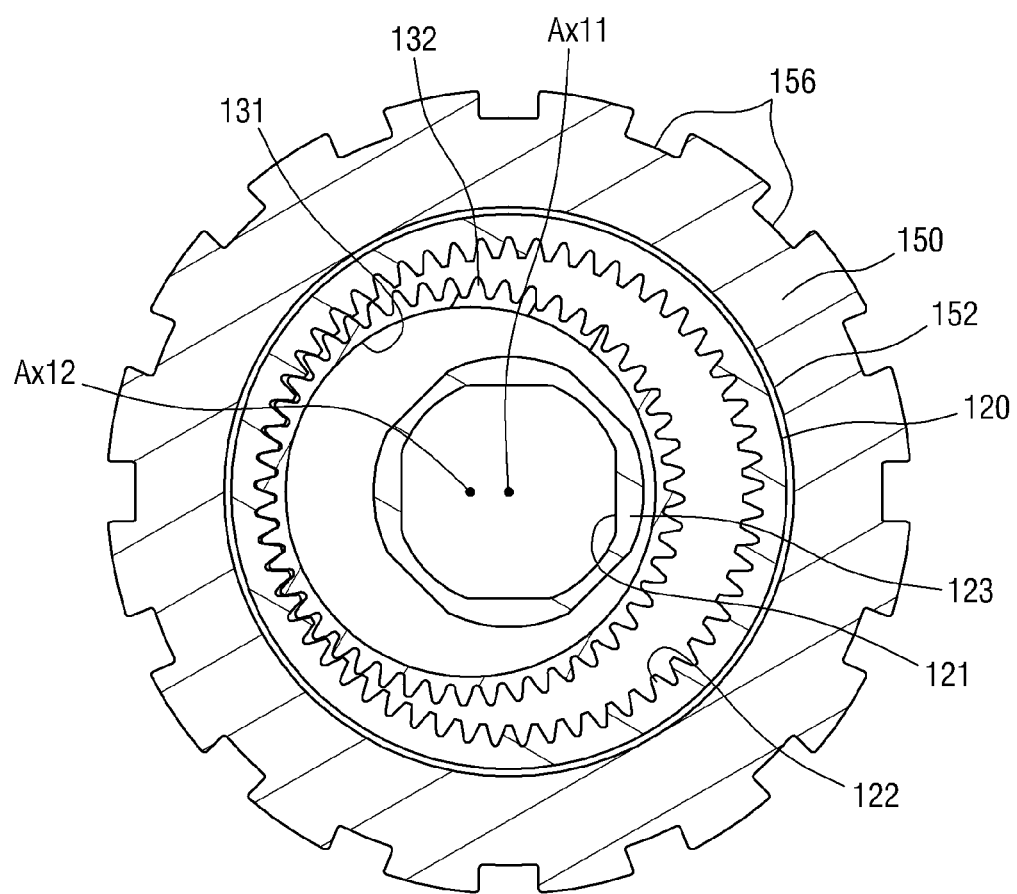
Figure 10:
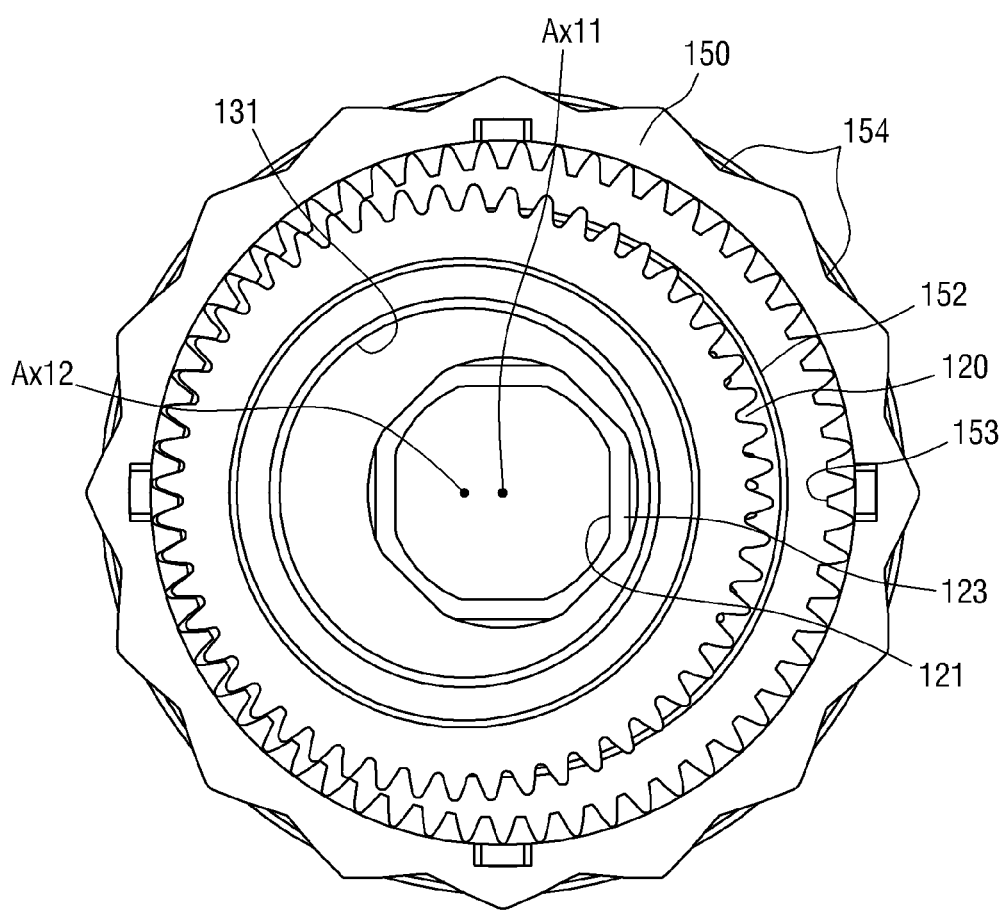

In the exemplary embodiment of the present invention, the description will be given of when the first external gear 132 and the second external gear 133 are formed to have the diameters less than the diameter d11 of the first internal gear 122 and the diameter d12 of the second internal gear 153, as illustrated in FIG. 9, when a first side of the first external gear 132 meshes with the first internal gear 122, a second side of the first external gear 132 is spaced apart from the first internal gear 122, and as illustrated in FIG. 10, when a first side of the second external gear 133 meshes with the second internal gear 153, a second side of the second external gear 133 may be spaced apart from the second internal gear 153.

Thus, the first external gear 132 and the second external gear 133 have a central axis AX12 different from the rotational axis AX11 of the knob 110 to be advantageous for the downsizing, while obtaining a sufficient reduction effect, by allowing the first external gear 132 and the second external gear 133 to rotate about the rotational axis AX11 of the knob 110 and to rotate about the central axis AX12, thereby achieving a high gear ratio even without increasing a difference in diameters of the gears meshing with each other.

Hereinafter, both of the "rotational axis" and the "central axis" of the terms used in exemplary embodiments of the present invention indicates the axis that is a center of turning (e.g., rotation or revolution), and although the different terms are used for the convenience of explanation, their meanings should be understood as being identical to each other.

In the exemplary embodiment of the present invention, although the description has been given of the plurality of the gear units 120 and 130 including two gear units, this is merely an example for aiding understanding of the present invention, and the number of the gear units may be variously modified based on the gear ratio and the reasons of design, without being limited thereto.

Moreover, since the second external gear 133 of the second gear unit 130 meshes with the second internal gear 153, the rotational force of the knob 110 may be transmitted to the first external gear 132 by the first gear unit 120 and simultaneously may be transmitted to the operation unit 150 meshing with the second external gear 133, the operation unit 150 may be configured to rotate when the knob 110 rotates, and thus, the operation feeling may be generated when operating the knob 110.

The operation unit 150 may include a plurality of detent grooves 154 formed along the outer circumference, and the operation feeling may be generated by at least one bullet 155 caught by the plurality of detent grooves 154 when the operation unit 150 rotates. Particularly, at least one bullet 155 may be elastically supported by an elastic member 155a such as a spring, at least one bullet 155 may be maintained in contact with the plurality of detent grooves 154, and thus, the operation feeling may be generated when the operation unit 150 turns. The operation feeling may be a response that a driver receives in response to rotating the operation unit 150. For example, the driver may feel a click or catch of the bullet in the detent grooves 154.

In the exemplary embodiment of the present invention, although the description has been given of the bullets 155 disposed on each side of the operation unit 150 as an example, the positions, the numbers or the like of the bullets 155 may be variously modified without being limited thereto. Further, the operation unit 150 may be formed with a plurality of fixing grooves 156 formed along the outer circumference as in the plurality of detent grooves 154. The plurality of fixing grooves 156 may be used to restrain the rotation of the operation unit 150 or release the restraint, and the detailed description thereof will be described later. Although the description will be given of the plurality of detent grooves 154 and the plurality of fixing grooves 156 coupled to each other after being formed in each of the different members to form the operation unit 150 as an example, the plurality of detent grooves 154 and the plurality of fixing grooves 156 may be integrally formed without being limited thereto.

Furthermore, the detection unit 140 may be configured to detect the shift stage selected by rotation of the knob 110. The detection unit 140 may include a plurality of gears 141 and 142 and a sensor 143 disposed to mesh with each other. Particularly, one 141 (e.g., a first gear 141) of the plurality of gears 141 and 142 may be connected to an extension member 123 of the first gear unit 120, and the other 142 (e.g., a second gear 142) thereof may include a magnet 142a. The sensor 143 may include an aperture sensor configured to detect a change of the magnetic force caused by the magnet 142a which changes in position when the plurality of gears 141 and 142 rotate. Thus, the sensor 143 may be configured to detect the shift stage selected by rotation of the knob 110.

In the exemplary embodiment of the present invention, the description will be given of a case where the plurality of gears 141 and 142 having different diameters as an example, which is to allow the easier detection of the shift stage by relatively converting the rotational angle of the knob 110, and the type and number of gears included in the detection unit 140 may be variously modified. In other words, in the exemplary embodiment of the present invention, the diameter of the gear 142 provided with the magnet 142a may be set to be less than the diameter of the gear 141 connected to the shaft 123 of the first gear unit 120 to relatively convert the rotational angle of the knob 110.

Additionally, in the exemplary embodiment of the present invention, although a case of detecting the changes in the magnetic force based on the positions of the magnet 142a to detect the shift stage will be described as an example, the detection unit 140 may be configured to detect the shift stage through various methods, such as detecting the shift stage by including a light-emitting element and a light-receiving element and by detecting the number of slits passing between the light-emitting element and the light-receiving element based on the rotation of the knob 110, without being limited thereto. The restoring unit 160 may be configured to restore the knob 110 to a preset shift stage when the startup of the vehicle is turned off or there is another operation command, thereby making it possible to automatically restore the knob 110 to the preset shift stage when the preset restoring conditions are satisfied so that no problems occur when operating the vehicle even when a driver does not separately restore the shift stage.

The restoring unit 160 in the exemplary embodiment of the present invention will be described as being configured to restore the knob 110 to a parking stage when a restoring condition from the non-parking stage to a parking stage is satisfied. As an example, the restoring unit 160 may be configured to rotate the knob 110 to be automatically restored to the park stage (P), when there are stages P, reverse (R), neutral (N) and drive (D) as shift stages selectable through the rotation of the knob 110, and when the driver turns off the startup at the stage D as one of the restoring conditions or a separate operation is input from the driver. The description will be provided of when the non-parking stage is the stages R, N and D at which the vehicle may travel and the parking stage is the stage P at which the traveling of the vehicle is restrained (e.g., the vehicle is parked or stopped and blocked from moving).

In the exemplary embodiment of the present invention, although the description will be given of the restoring unit 160 configured to restore the knob 110 to the parking stage when the restoring condition from the non-parking condition to the parking condition is satisfied as an example, the restoring unit 160 may be configured to restore the knob 110 to the preset shift stage, based on various restoring conditions, without being limited thereto. For example, the restoring unit 160 may be configured to restore the knob 110 to the previous shift stage when the erroneous operation of the knob 110 occurs in the traveling state of the vehicle. Specifically, the restoring unit 160 may be configured to restore the knob 100 to the stage D as the previous shift stage when the knob 110 is rotated by the erroneous operation of the driver to prevent the selection of other shift stages during traveling of the vehicle at the stage D.

Particularly, the restoring unit 160 may include a drive unit 161 and a third gear unit 162. The third gear unit 162 may be rotate by the drive unit 161, and as an example, the third gear unit 162 may include a worm wheel configured to rotate in the state of meshing with a worm gear 161a disposed on the rotational shaft of the drive unit 161. An insertion protrusion 162a may be formed on one side of the third gear unit 162, and the insertion protrusion 162a may be inserted into the cavity 131 of the second gear unit 130 to seat the second gear unit 130 thereon. A central axis AX12 of the insertion protrusion 162a may be spaced apart from the rotational axis AX11 of the knob 110 in one side direction, similarly to the center axis AX12 of the second gear unit 130.

Therefore, when the third gear unit 162 is rotated by the drive unit 161, the third gear unit 162 may be configured to rotate about the rotational axis AX11 of the knob 110, and meanwhile, the second gear unit 130 may be configured to receive a force in an outward direction based on the rotational axis AX11 of the knob 110 by the insertion protrusion 162a. Thus, the revolution and the rotation may be performed about the rotational axis AX11 of the knob 110. Accordingly, when the second gear unit 130 rotates, the rotational force of the drive unit 161 may be transmitted to the first gear unit 120 and the knob 110 may be configured to rotate. In the exemplary embodiment of the present invention, since the second gear unit 130 may be configured to rotate about the rotational axis AX11 of the knob 110 and simultaneously rotate about the center axis AX12 of the second gear unit 130, the reduction effect may be obtained, advantageous for miniaturization compared to using the diameter of relatively substantial differences to obtain a high gear ratio.

Further, since the extension member 123 of the first gear unit 120 may be connected to the detection unit 140 through the cavity 131 of the second gear unit 130 and the cavity 162b of the third gear unit 162, even when the drive unit 161 is not operated, when the knob 110 is rotated, the shaft 123 of the first gear unit 120 may be configured to rotate. When the knob 110 is restored to the preset shift stage by the restoring unit 160, the startup of the vehicle may be turned off or another operation command operation may be executed, and since an occurrence of operation feeling is not required, in this case, the locking unit 170 may be configured to restrain the rotation of the operation unit 150 to prevent the occurrence of the unnecessary operation feeling and reduce the noise.

The locking unit 170 may include a drive unit 171 and a locking member 172. In particular, the drive unit 171 of the locking unit 170 may include a moving rod 171a configured to move linearly as a solenoid. The locking member 172 may be connected to one end (e.g., a first end) of the moving rod 171a, and may be configured to restrain the turning of the operation unit 150 when locking member 172 is rotated about the rotational axis 172a during movement of the moving rod 171a and one side (e.g., a first side) of the locking member 172 may be inserted into one of a plurality of fixing grooves 156. In addition, the locking member 172 may be configured to release the restraint of the rotation of the operation unit 150 when the first side of the locking member 172 is disengaged from the plurality of fixing grooves 156.

Additionally, the connection groove 171b may be formed at a first end of the moving rod 171a, a connection protrusion 172b formed in the locking member 172 may be inserted into the connection groove 171b. When the connection protrusion 173b flows inside the connection groove 171b with the movement of the moving rod 171a, and the linear movement of the moving rod 171a may be converted into the rotational movement of the locking member 172.

Figure 11:
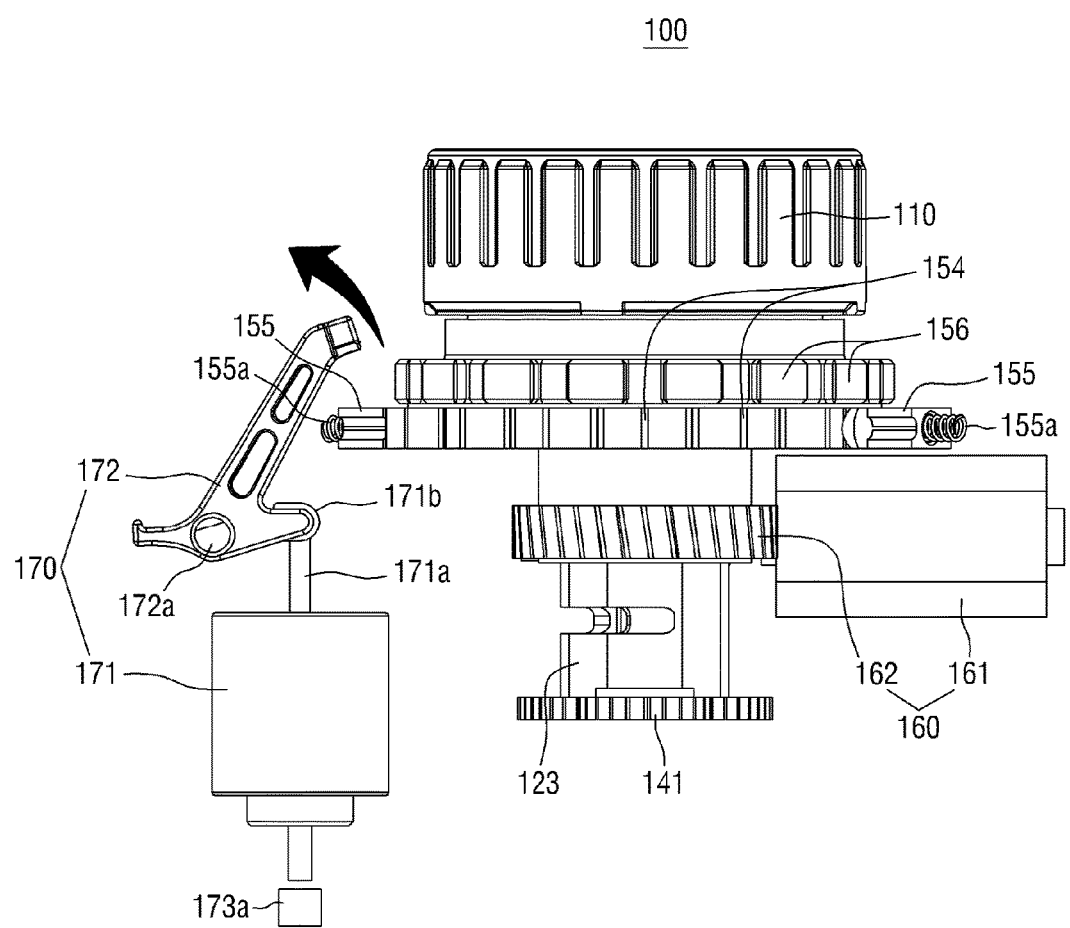
FIG. 11 is a side view illustrating the vehicle transmission in which the restraint of the rotation of the operation unit according to the exemplary embodiment of the present invention is released.

In other words, when attempting to restrain the rotation of the operation unit 150, as illustrated in FIG. 5 described above, the locking unit 170 may be disposed to allow the first side of the locking member 172 to be inserted into one of the plurality of fixing grooves 156. However, when releasing the restraint of the rotation of the operation unit 150, while the locking member 172 is rotated in the opposite direction, as illustrated in FIG. 11, the position of the locking unit 170 may be changed in which the first side of the locking member 172 is disengaged from the plurality of fixing grooves 156, to thus release the restraint of the rotation of the operation unit 150.

Further, in the exemplary embodiment of the present invention, the description will be given of the drive unit 171 being a bidirectional solenoid in which the power may be supplied during movement of the moving rod 171a, and after the movement of the moving rod 171a is completed, the current position may be maintained without the restoration of the moving rod 171a to the previous position even when the power supply is stopped. In other words, the typical solenoid may be a unidirectional solenoid configured to convert the electrical signal into the linear movement, and when moving the plunger in one side direction, the power may be continuously supplied, and when moving the plunger in the other direction (e.g., an opposite direction) as an original position, the power supply may be stopped.

Figure 12:
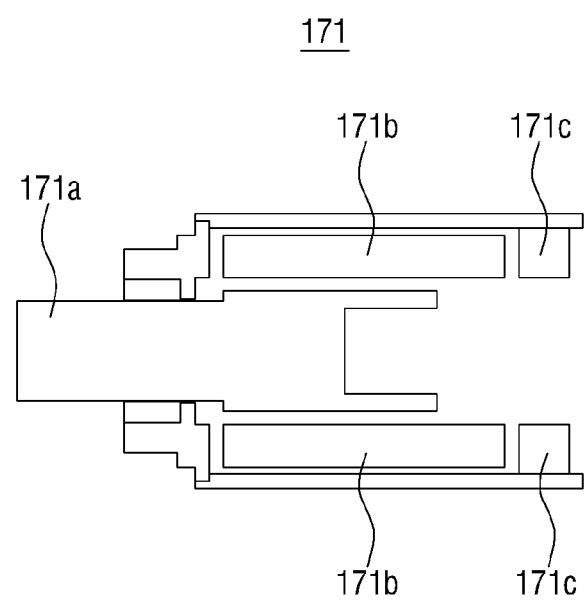
FIGS. 12 and 13 are schematic views illustrating a drive unit of a locking unit according to the exemplary embodiment of the present invention.
Figure 13:
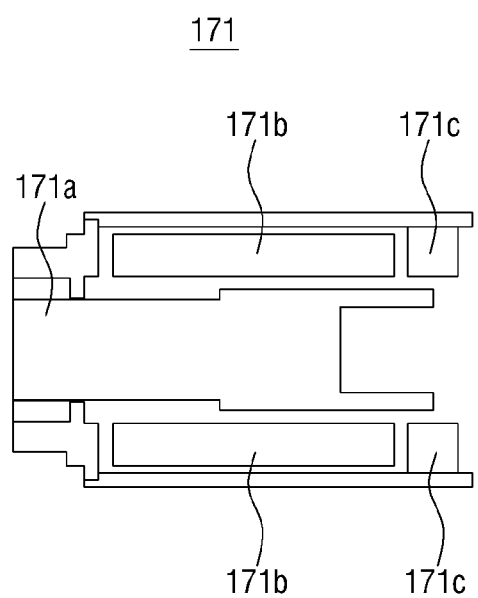

Therefore, to maintain the plunger being moved in one direction, the continuous supplying of the power supply is required. However, since the drive unit 171 according to an exemplary embodiment of the present invention may be supplied with the power supply when the moving rod 171a is moved, the power consumption may be reduced, and the heat generation may be reduced. Specifically, the drive unit 171 according to an exemplary embodiment of the present invention may include a coil 171b wound along the outer circumference of the moving rod 171a and the magnet 171c disposed on one side of the coil 171b as illustrated in FIGS. 12 and 13. The coil 171b may be configured to move the moving rod 171a in a direction approaching the magnet 171c or a direction away from the magnet 171c when the power supply is supplied. The magnet 171c may be configured to maintain the position of the moving rod 171a even when the power supply to the coil 171b is stopped. Further, although it is not illustrated in FIGS. 12 and 13, a spring (not illustrated) may be disposed between the moving rod 171a and the magnet 171c to elastically support the moving rod 171a.

Referring to FIG. 12, it may be possible to detect that the moving rod 171a is in a state of being moved in the direction away from the magnet 171c. In particular, after the power supply (e.g., +V) is supplied to the coil 171b and the moving rod 171a may be moved, even when the power supply to the coil 171b is stopped, and the position of the moving rod 171a may be maintained by a spring that elastically supports the above-described moving rod 171a. As shown in FIG. 12, the distance between the moving rod 171a and the magnet 171c may increase, the attractive force of the magnet 321b may become less than the elastic force of the spring, and the position of the moving rod 171a may be maintained.

Referring to FIG. 13, it may be possible to detect that the moving rod 171a moving in a direction approaching the magnet 171c. In particular, the voltage (e.g., −V) with polarity opposite of FIG. 12 described above may be supplied to the coil 171b, and the moving rod 171a may be moved in the direction approaching the magnet 171c. As shown in FIG. 13, although the moving rod 171a may be moved in the direction approaching the magnet 171c and the spring configured to support the moving rod 171a may be in the compressed state, since the distance between the moving rod 171a and the magnet 171c decreases, the attractive force of the magnet 171c becomes greater than the elastic force of the spring, and the position of the moving rod 171a may be maintained.

In an exemplary embodiment of the present invention, since the description has been given of the moving rod 171a coupled to the locking member 172 as an example, it may be possible to understand that one of FIGS. 12 and 13 described above is in a state in which the locking member 172 restrains the rotation of the operation unit 150, and is in a state in which the locking member 172 releases the restraint of the rotation of the operation unit 500. Further, the polarity of the voltage applied to the coil 171b in FIGS. 12 and 13 described above is merely an example for aiding understanding of the present invention, and the polarity of the voltage supplied may vary, based on the winding direction of the coil 171b or the like.

Figure 14:
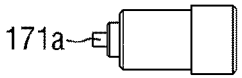
FIG. 14 is a table illustrating an operating state of the drive unit of the locking unit according to an exemplary embodiment of the present invention.
Figure 14:
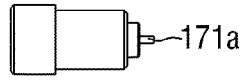
Figure 14:
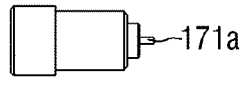
Figure 14:
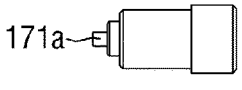

The operating state of the drive unit 171 according to FIGS. 12 and 13 described above will be described referring to FIG. 14. Referring to FIG. 14, at the initial position, when the moving rod 171a is disposed, as illustrated in FIG. 12 described above, since the elastic force of the spring becomes greater than the attractive force of the magnet 171c, even when the power is not supplied to the coil 171b, the moving rod 171a may be maintained at the initial position.

When attempting to switch the position of the moving rod 171a, the positive voltage may be supplied to the coil 171b, and the moving rod 171a may be moved in the direction approaching the magnet 171c. In particular, the sum of the magnetic force caused by the coil 171b and the attractive force of the magnet 171c may become larger than the elastic force of the spring, and the moving rod 171a may be moved. When the moving rod 171a is maintained at the switched position, after the switching of the position of the moving rod 171a is completed, even when the distance between the moving rod 171a and the magnet 171c decreases, the attractive force of the magnet 171c becomes greater than the elastic force of the spring and the power is not supplied to the coil 171b, the position of the moving rod 171a may be maintained.

Additionally, when attempting to restore the moving rod 171a to the initial position, the negative voltage may be supplied to the coil 171b. Particularly, the magnetic force caused by the coil 171b and the attractive force caused by the magnet 171c may be offset from each other, and the moving rod 171a may be restored to the initial position by the elastic force of the spring. Accordingly, as illustrated in FIGS. 12 through 14 described above, in the drive unit 171 according to the exemplary embodiment of the present invention, the current may be supplied while the moving rod 171a is moved to switch the position of the locking member 172 when restraining the rotation of the operation unit 150 or releasing the restraint thereof by moving the moving rod 171a to shift the position of the locking member 172, and the position of the locking member 172 may be maintained even when the current is not supplied in other cases. Thus, the power consumption may be reduced, and the heat generation may be reduced.

Further, the drive unit 171 of FIGS. 12 to 14 described above is merely an example for aiding understanding of the present invention, and it may be possible to have various configurations in which the power is applied when the position of the locking member 172 is switched, without being limited thereto. Meanwhile, the locking unit 170 may include a position detection unit 173 configured to detect the position of the locking member 172 to determine the restrained state of rotation of the locking member operation unit 150 or the released state of the restraint by the locking member 172.

In the exemplary embodiment of the present invention, the description will be given of the position detection unit 173 including a photo-sensor configured to adjust the light-emitting element 173a and the light-receiving element 173b to face each other and may be configured to detect the transmitted light therebetween as an example. However, this is merely an example for aiding understanding of the present invention, and various sensors (e.g., a non-contact sensor or contact sensor) configured to detect the switching of the position of the locking member 172 may be used, without being limited thereto.

Further, in the exemplary embodiment of the present invention, the description will be given of the position detection unit 173 configured to detect the position of the locking member 172 using the position detection of the moving rod 171a of the drive unit 171 coupled to the locking member 172 as an example. However, it may also be possible to detect the position of the locking member 172 itself and the position and type of the position detection unit 173 may vary based on the shape of the locking member 172, without being limited thereto.

In addition, although the description will be given of an example in which the locking unit 170 restrains the rotation of the operation unit 150 or releases the restraint thereof when the knob 110 is restored to the pre-set shift stage as an example, the locking unit 170 may also be configured to perform the shift-lock function in a particular shift stage, when the shift stage is changed by the rotation of the knob 110, without being limited thereto. For example, when attempting to change from the stage P to the stage R, the locking unit 170 may be configured to restrain the rotation of the operation unit 150, and release the restraint of the rotation of the operation unit 150 to allow the knob 110 to rotate, when the brake pedal is operated or engaged.

In the vehicle transmission 100 according to the exemplary embodiment of the present invention as described above, when the driver attempts to change the shift stage by rotating the knob 110, since the drive unit 161 of the restoring unit 160 is not operated and the third gear unit 162 is in the stopped state, when the knob 110 rotates, the rotational force of the knob 110 may be transmitted to the first gear unit 120, the second gear unit 130 and the operation unit 150, and the operation feeling may be generated while the operation unit 150 is rotated.

Meanwhile, when the restoring unit 160 restores the knob 110 to the reset shift stage, the drive unit 161 of the restoring unit 160 may be driven, the rotational force of the drive unit 161 may be transmitted to the third gear unit 162, the second gear unit 130, the first gear unit 120 and the knob 110, the knob 110 may be configured to rotate, and in this case, the rotation of the operation feeling generation unit 150 may be restrained by the locking unit 170. This is advantageous from the viewpoint of allowing the driver to more easily recognize the selection of the shift stage by providing the operation feeling to the driver when the knob 110 is turned by the driver to select the shift stage. However, since the restoration of the knob 110 to the preset shift stage may be understood as a situation in which driver exits the vehicle or the vehicle is not actually operated, the restraint may also prevent generation of noises or the like caused by the generation of the unnecessary operation feeling.

Furthermore, in the above-described exemplary embodiment, although the description has been provided of the rotational axis 172a of the locking member 172 of the locking unit 170 being in a direction perpendicular to the rotational axis AX11 of the knob 110 as an example, the locking unit 170 may have various configurations, without being limited thereto.

Figure 15:
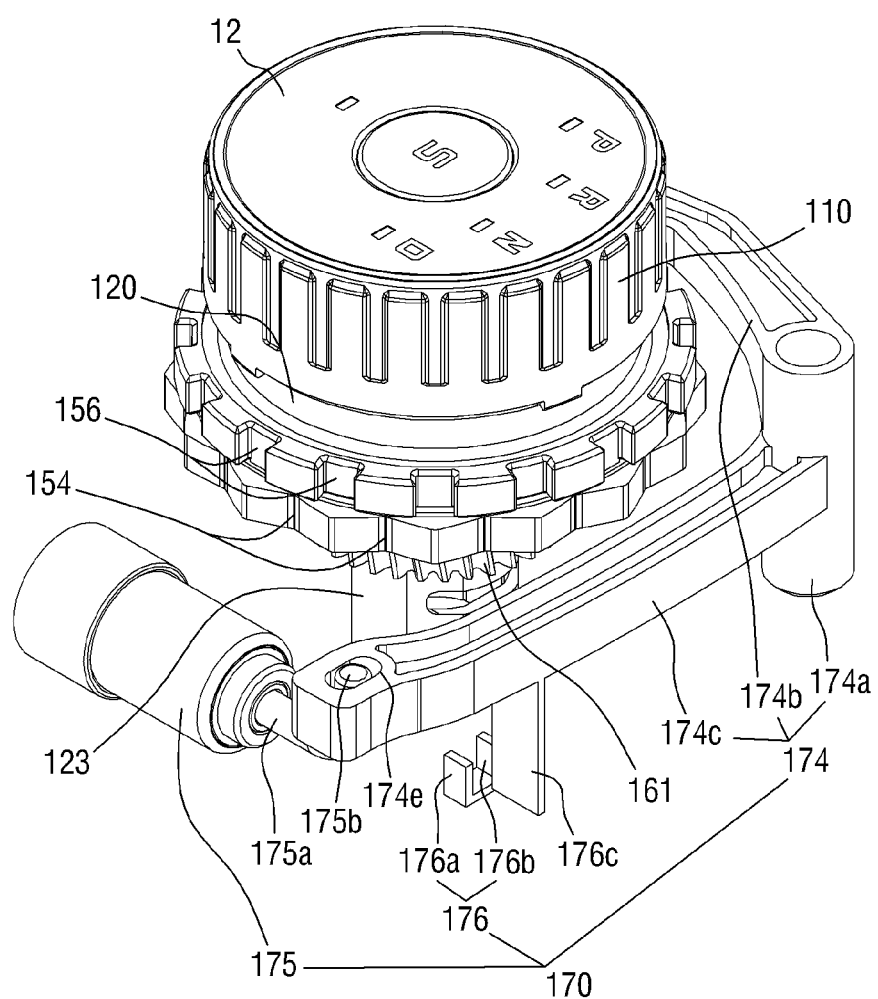
FIG. 15 is a perspective view illustrating the locking unit that restrains the rotation of an operation unit according to another exemplary embodiment of the present invention.
Figure 16:
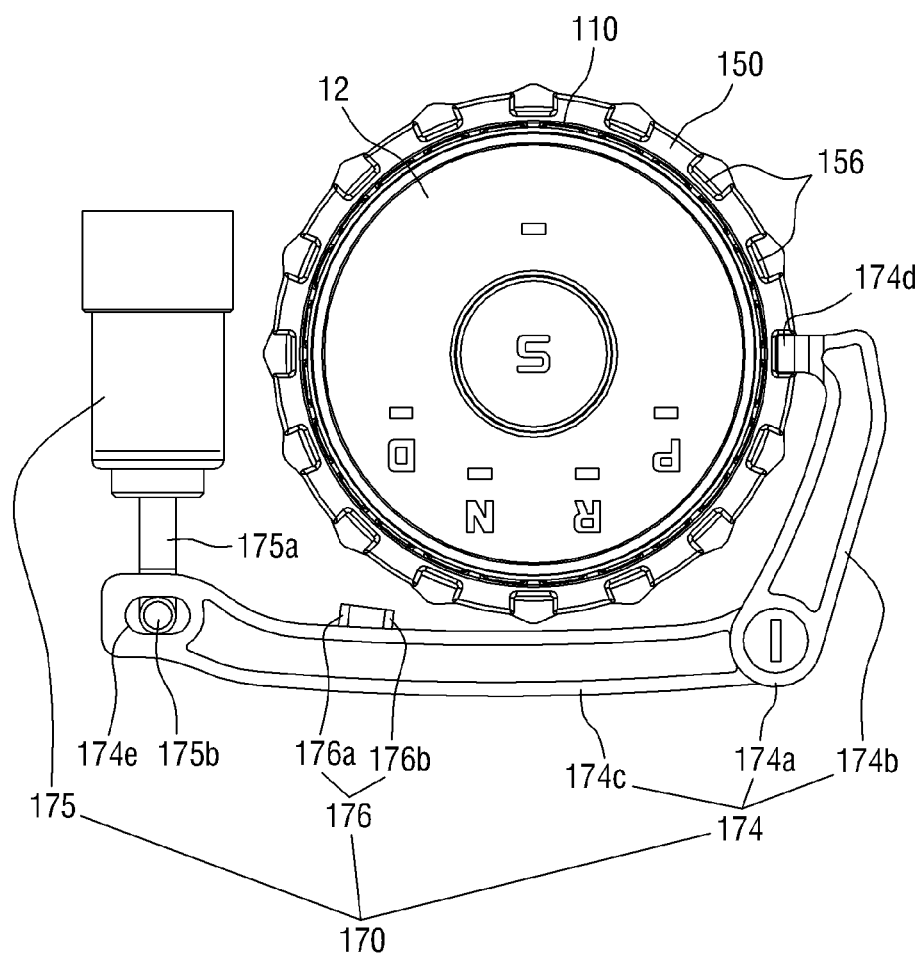
FIG. 16 is a plan view illustrating the locking unit that restrains the rotation of the operation unit according to another exemplary embodiment of the present invention.
Figure 17:
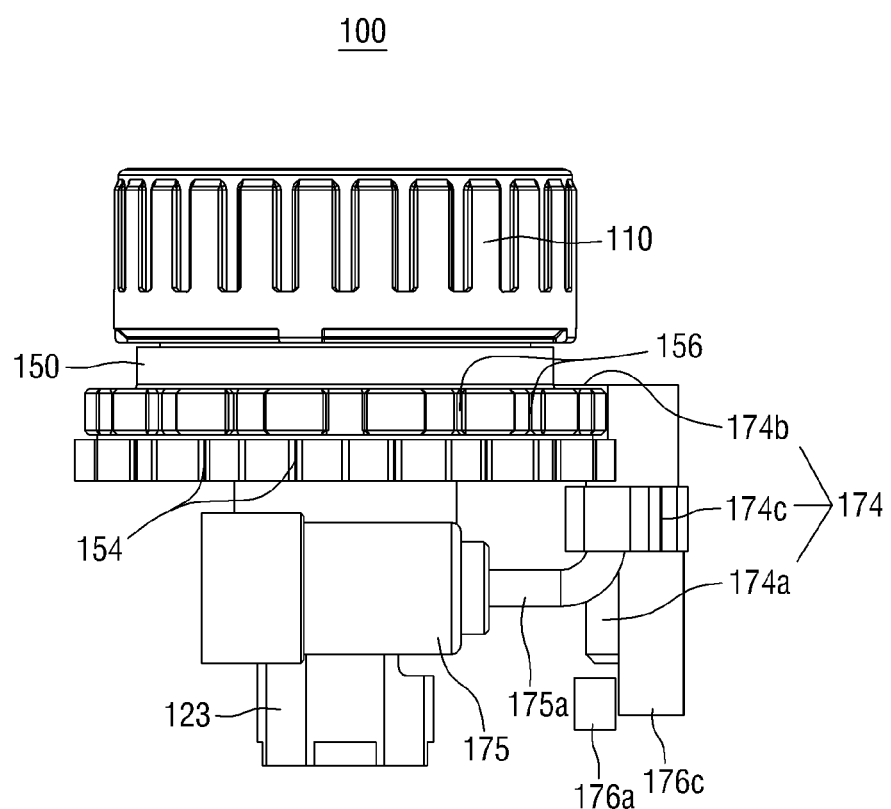
FIG. 17 is a side view illustrating the locking unit that restrains the rotation of the operation unit according to another exemplary embodiment of the present invention.
Figure 18:
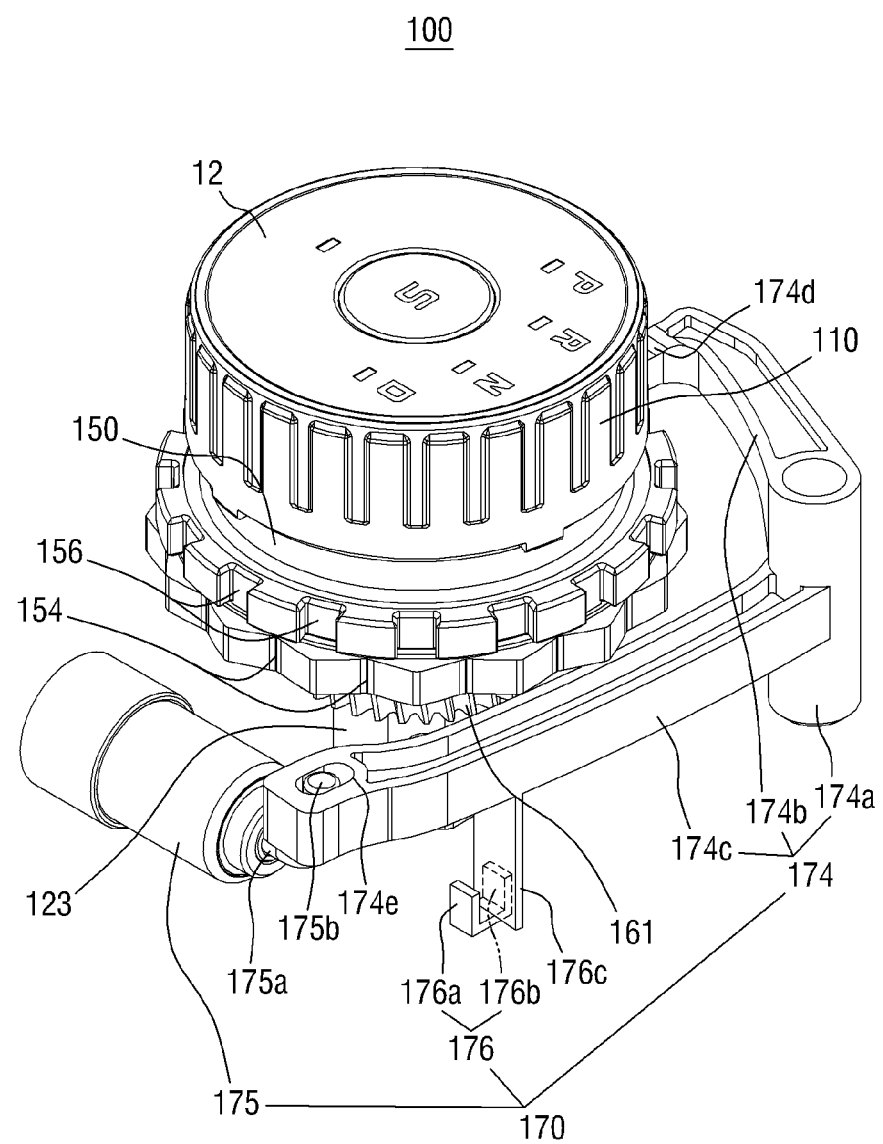
FIG. 18 is a perspective view illustrating the locking unit that releases the rotation of the turning of the operation unit according to another exemplary embodiment of the present invention.
Figure 19:
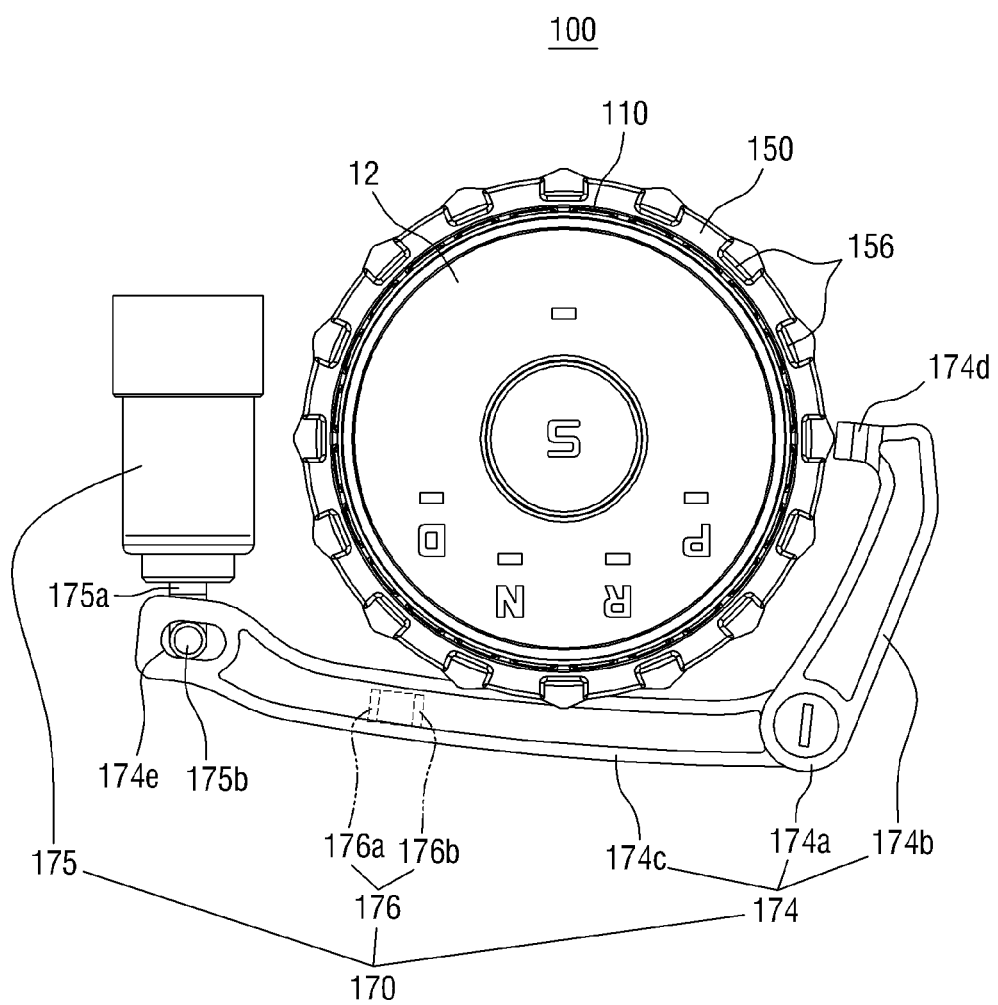
FIG. 19 is a plan view illustrating the locking unit that releases the restraint of the rotation of the operation unit according to another exemplary embodiment of the present invention.
Figure 20:
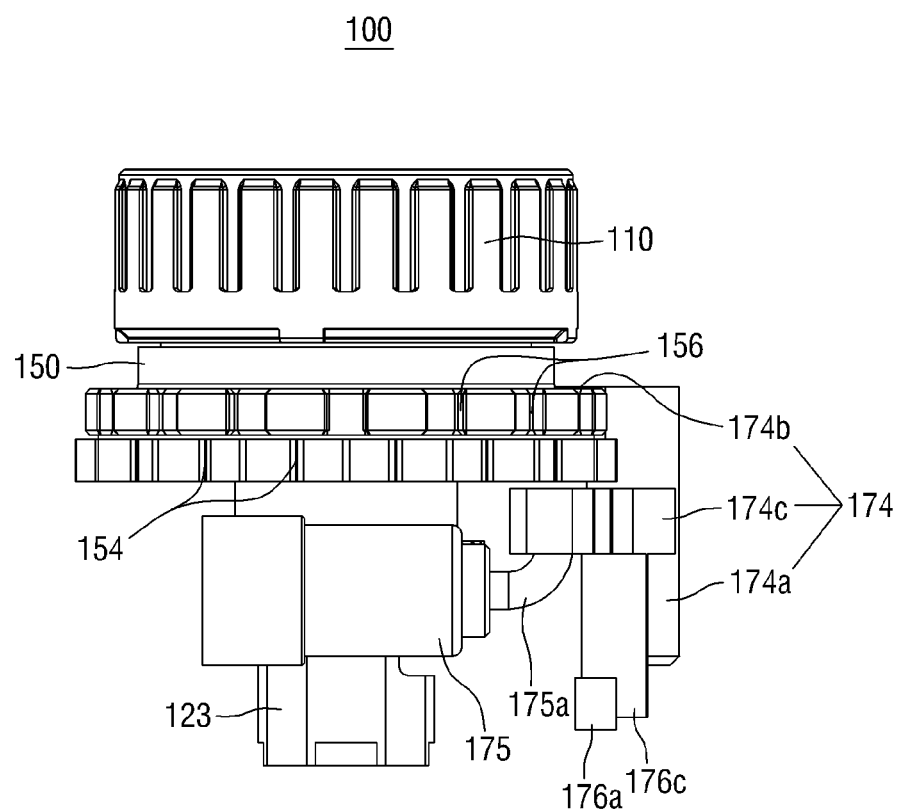
FIG. 20 is a side view illustrating the locking unit that releases the restraint of the rotation of the operation unit according to another exemplary embodiment of the present invention.

FIG. 15 is a perspective view illustrating the locking unit that restrains the turning of an operation unit according to another exemplary embodiment of the present invention, FIG. 16 is a plan view illustrating the locking unit that restrains the rotation of the operation unit according to another exemplary embodiment of the present invention, FIG. 17 is a side view illustrating the locking unit that restrains the rotation of the operation unit according to another exemplary embodiment of the present invention, FIG. 18 is a perspective view illustrating the locking unit that releases the restraint of the rotation of the operation unit according to another exemplary embodiment of the present invention, FIG. 19 is a plan view illustrating the locking unit that releases the restraint of rotation turning of the operation unit according to another exemplary embodiment of the present invention, and FIG. 20 is a side view illustrating the locking unit that releases the restraint of the rotation of the operation unit according to another exemplary embodiment of the present invention.

Referring to FIGS. 15 through 20, a locking unit 170 according to another exemplary embodiment of the present invention may include a locking member 174, a drive unit 175 and a position detection unit 176. In another exemplary embodiment of the present invention, since other constituent elements other than the locking unit 170 are the same as those of the above-described embodiment, the detailed description thereof will be omitted, and the constituent elements having the same role as the above-described embodiment will be denoted by the same reference numerals.

In particular, the locking member 174 may include a first extension rod 174b and a second extension rod 174c that extend in different directions from each other about the rotational shaft 174a. The first extension rod 174b may be configured to restrain the rotation of the operation unit 150 or release the restraint thereof, and the second extension rod 174c may be connected to the drive unit 175. Additionally, the drive unit 175 of the locking unit 170 may have a similar structure as the drive unit 171 of the exemplary embodiment described above. Similarly to the above-described FIGS. 12 to 14, the drive unit 175 may be made up of a bidirectional solenoid in which the power may be supplied when switching the position of the locking member 174 and the power supply is stopped in other situations.

The description will be given of the rotation shaft 174a of the locking member 174 disposed in parallel with the rotational axis AX11 of the knob 110 and a moving rod 175a movably provided in the drive unit 175 moved in a direction perpendicular to the rotational shaft 174a of the locking member 174. A catching protrusion 174d may be formed at a first end of the first extension rod 174b, and the catching protrusion 174d may be caught or stopped by one of the plurality of fixing grooves 156 formed in the operation unit 150 based on the positions of the locking member 174. The second extension rod 174b may be formed with an insertion groove 174e into which a first end 175b of the moving rod 175a of the drive unit 175 may be inserted. The description will be given of the first end 175b of the moving rod 175a formed to be bent toward the insertion groove 174e of the second extension rod 174c as an example.

Additionally, the insertion groove 174e may be formed long in one direction (e.g., lengthwise in a first direction) to convert the linear movement of the moving rod 175a into the rotational movement of the locking member 174. In other words, the first end 175b of the moving rod 175a inserted into the insertion groove 174e may be configured to push or pull the second extension rod 174c, while moving along the insertion groove 174e when the moving rod 175a is linearly moved, and thus, the locking member 174 may be configured to rotate about the rotational shaft 174a.

Thus, in another exemplary embodiment of the present invention, as illustrated in FIGS. 15 to 17, when the first end 175b of the moving rod 175a is moved in a direction away from the drive unit 175, the catching protrusion 174d of the first extension rod 174b may be or stopped caught by any one of the plurality of fixing grooves 156 formed in the operation unit 150, and thus, the rotation of the operation unit 150 may be restrained. In addition, as illustrated in FIGS. 18 through 20, when the first end 175b of the moving rod 175a is moved in a direction approaching the drive unit 150, the catching protrusion 174d of the first extension rod 174b may be disengaged from the plurality of fixing grooves 156 formed on the operation unit 150, and the restraint of the turning of the operation unit 150 may be released.

Meanwhile, in another exemplary embodiment of the present invention, the locking unit 170 may further include a position detection unit 176 configured to detect the position of the locking member 174. The position detection unit 176 may include a photo-sensor in which the light-emitting element 176a and the light-receiving element 176b may be disposed to face each other to detect the transmitted light between both the elements in the same manner as the above-described embodiment.

Specifically, as illustrated in FIGS. 15 through 17, when the catching protrusion 174d of the first extension rod 174b is inserted into any one of the plurality of fixing grooves 156 formed in the operation unit 156 and the rotation of the operation unit 150 is constrained, since the extension protrusion 176c formed in the second extension rod 174c is out of a section between the light-emitting element 176a and the light-receiving element 176b and the transmitted light is detected, the transmitted light may be detected in the state in which the rotation of the operation unit 150 is restrained.

In addition, as illustrated in FIGS. 18 through 20, when the catching protrusion 174d of the first extension rod 174b is disengaged from the plurality of fixing grooves 156 formed in the operation unit 150, since the extension protrusion 176c formed in the second extension rod 174c may be disposed between the light-emitting element 176a and the light-receiving element 176b and the transmitted light is not detected, the transmitted light may be detected in the state in which the restraint of the rotation of the operation unit 150 is released. Although the description has been given of the position detection unit 176 configured to detect the locking member 174, i.e., the position of the extension protrusion 176c formed in the second extension rod 174c, the position of the moving rod 175a connected to the locking member 174 may also be detected in a similar manner, without being limited thereto.

As described above, in the vehicle transmission 100 according to an exemplary embodiment of the present invention, since the power may be supplied when the positions of the locking members 172 and 174 are switched by the locking unit 170 in which the bidirectional solenoid is used, the prolonged power supply may not be required to maintain the positions of the locking members 172 and 174 based on the shift stage. Thus, the power consumption may decrease, and the service life may be increased by decreasing the heat generation of the drive units 171 and 175.

Figure 21:
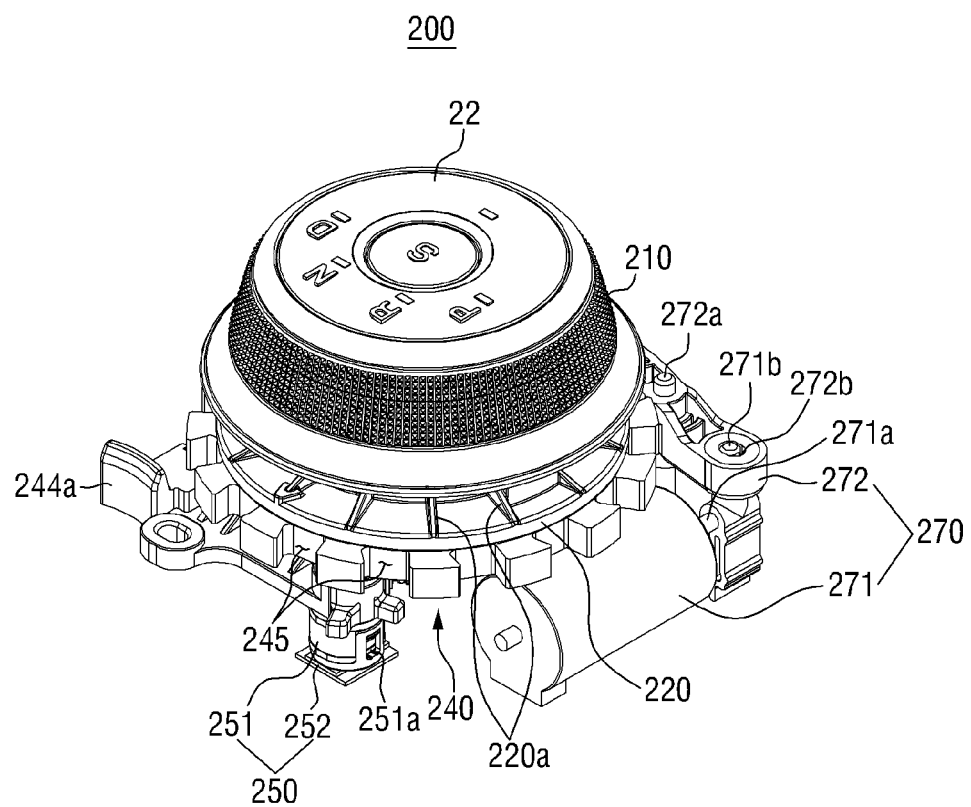
FIGS. 21 to 23 are perspective views illustrating the vehicle transmission according to another exemplary embodiment of the present invention.
Figure 22:
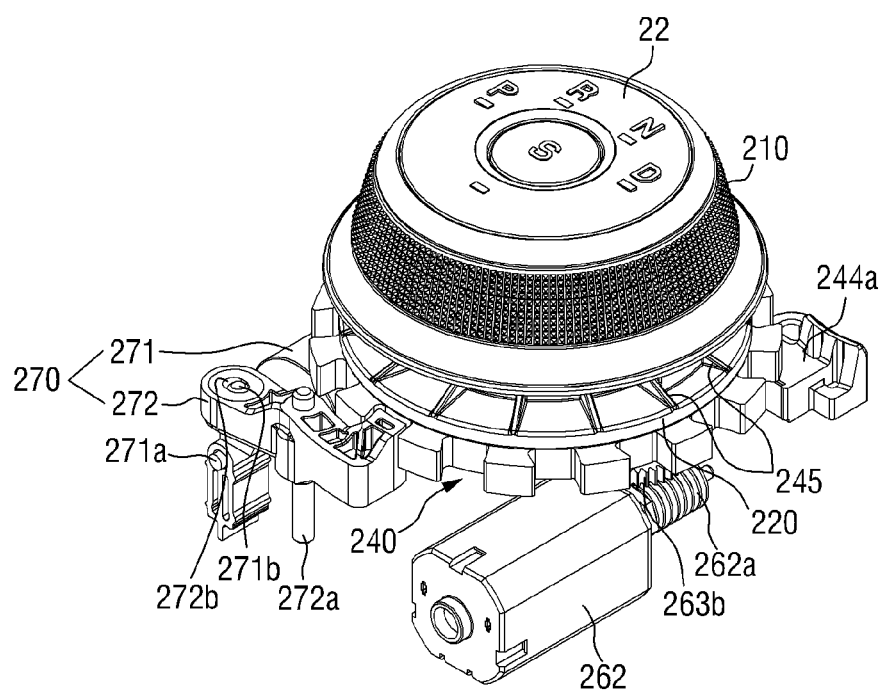
Figure 23:
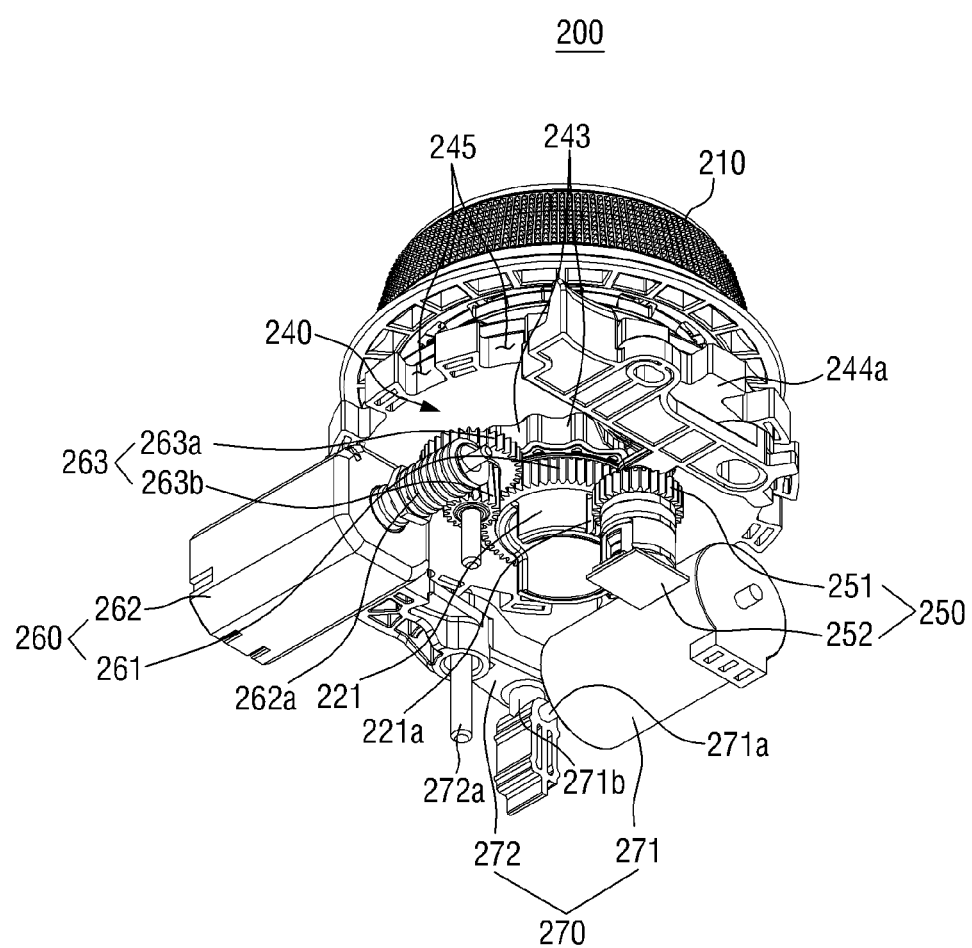
Figure 24:
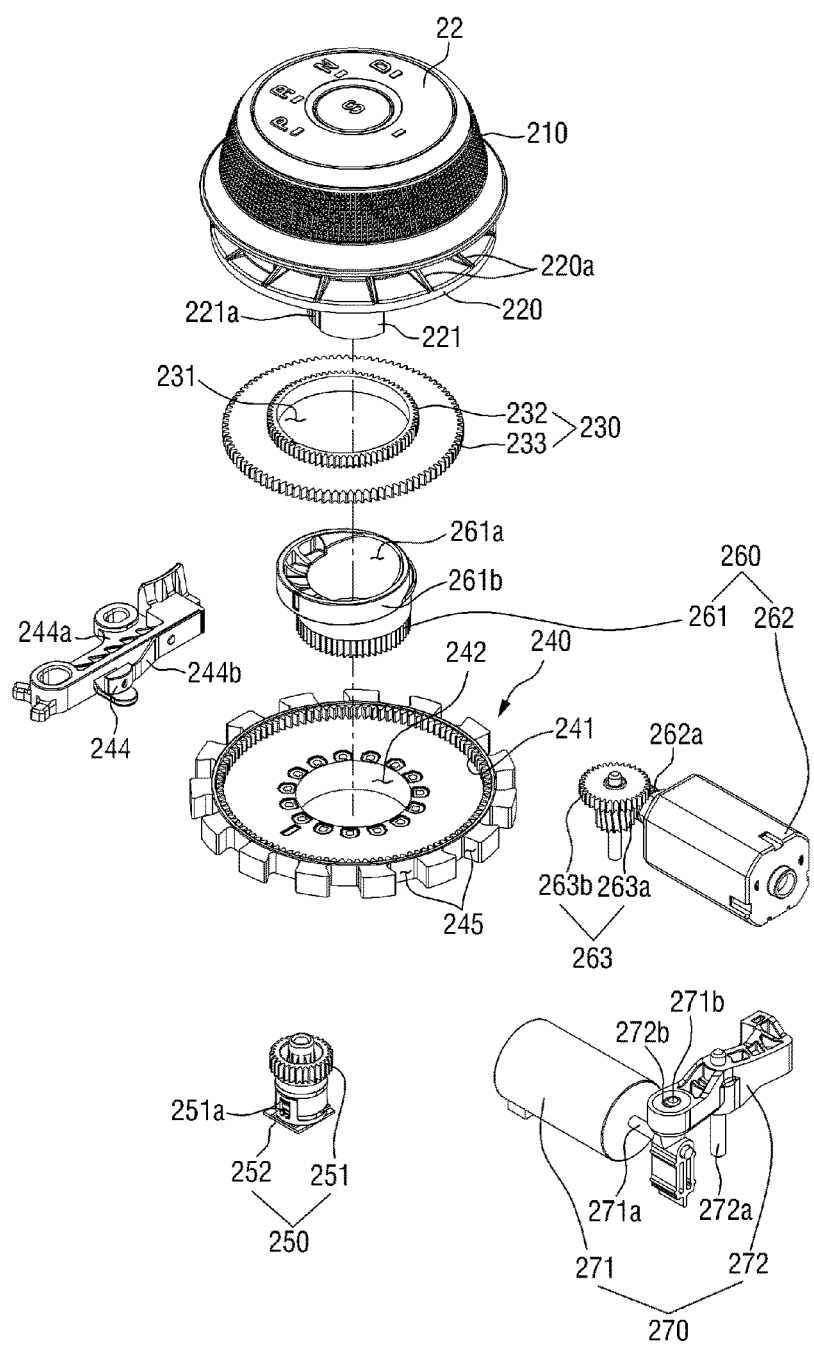
FIGS. 24 and 25 are detailed views of the vehicle transmission according to another exemplary embodiment of the present invention.
Figure 25:
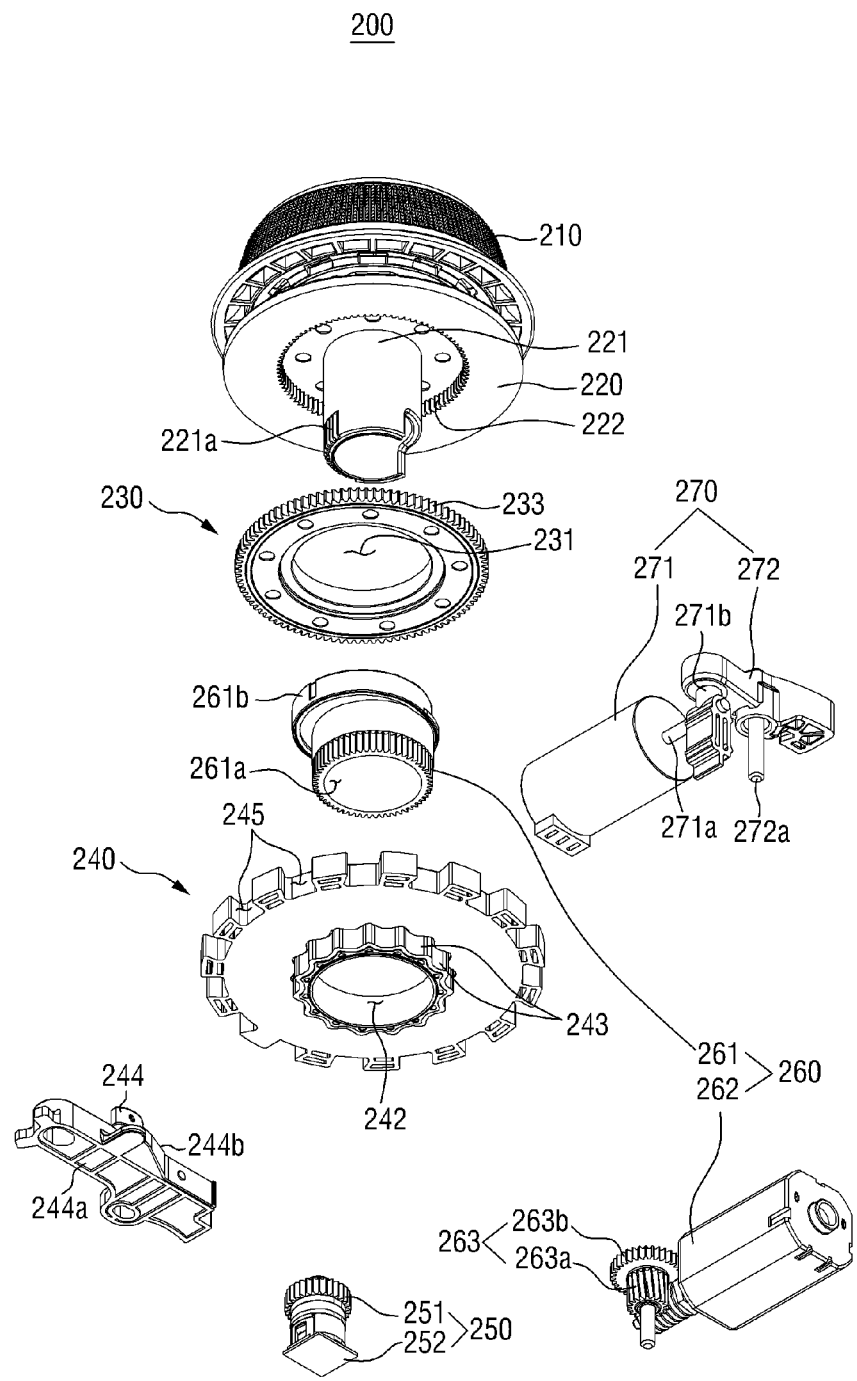
Figure 26:
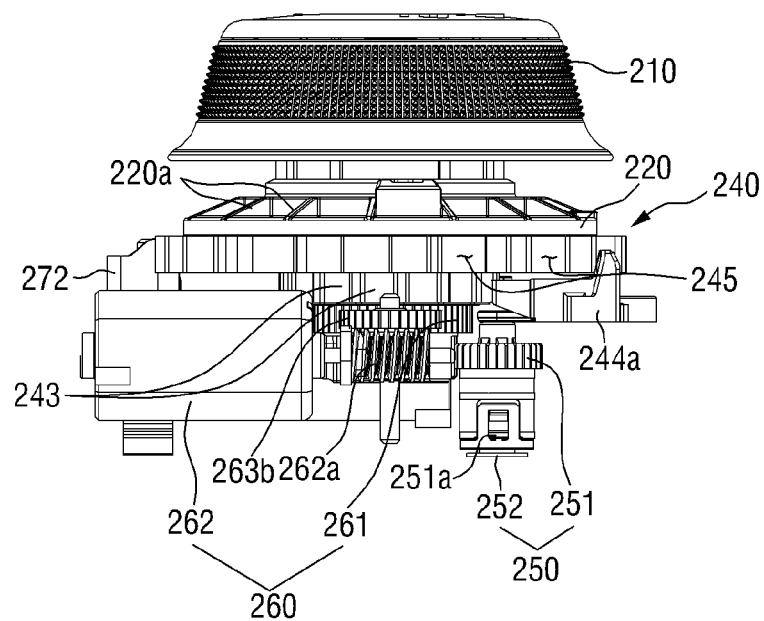
FIG. 26 is a side view illustrating the vehicle transmission according to another exemplary embodiment of the present invention.
Figure 27:
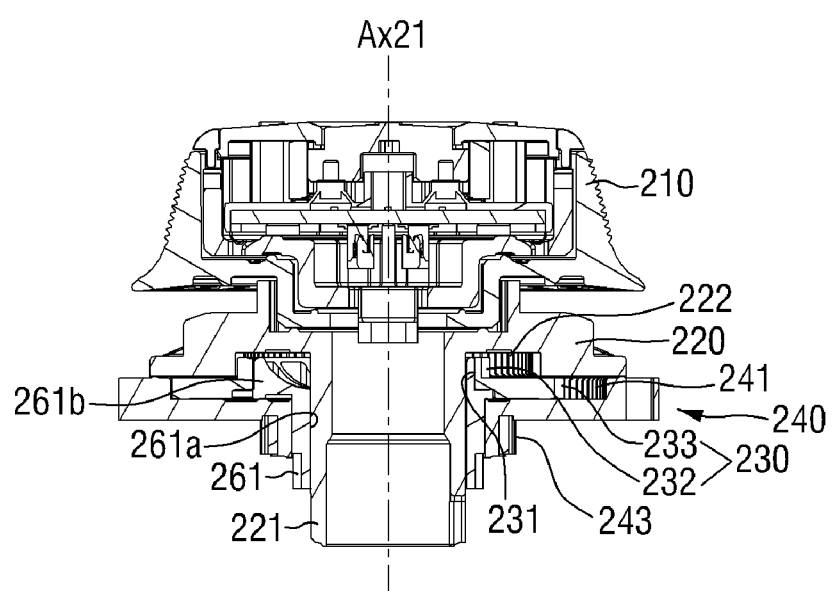
FIGS. 27 through 30 are cross-sectional views illustrating the vehicle transmission according to another exemplary embodiment of the present invention.
Figure 28:
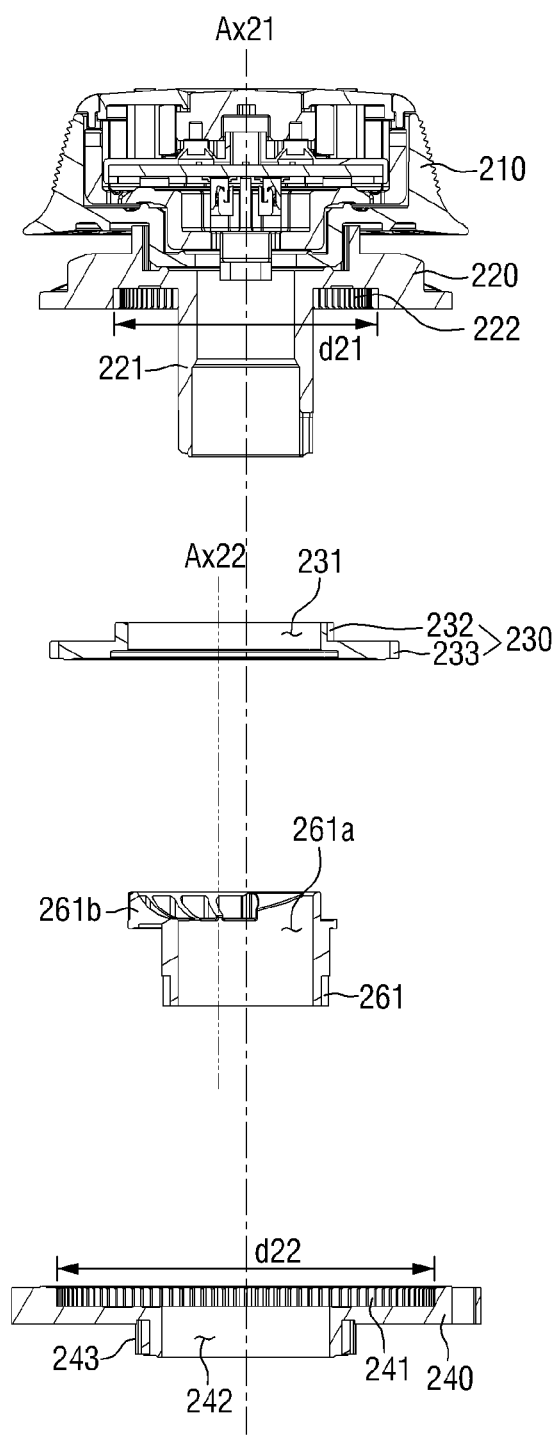

FIGS. 21 to 23 are perspective views illustrating the vehicle transmission according to another exemplary embodiment of the present invention, FIGS. 24 and 25 are detailed views of the vehicle transmission according to another exemplary embodiment of the present invention, FIG. 26 is a side view illustrating the vehicle transmission according to another exemplary embodiment of the present invention, and FIGS. 27 through 30 are cross-sectional views illustrating the vehicle transmission according to another exemplary embodiment of the present invention.

Referring to FIGS. 21 through 28, a vehicle transmission 200 according to another embodiment of the present invention may include a knob 210, a plurality of gear units 220 and 230, an operation unit 240, a detection unit 250, a restoring unit 260 and a locking unit 270. Although it is not illustrated in FIGS. 21 to 28, the remaining components other than the knob 210 may be disposed in a case (not illustrated) and may be disposed on the interior of the vehicle body.

Furthermore, the knob 210 may be configured to rotate to select the shift stage when the external force is applied by the driver as in the same way in the above described exemplary embodiments, and the knob 210 may include a display device 22 configured to display the selectable shift stage or the currently selected shift stage. In another exemplary embodiment of the present invention, although the description will be given of the display device 22 fixed and an outer surface of the knob 210 rotated to select the shift stage as an example, the knob 210 and the display device 22 may also be rotated together without being limited thereto.

The plurality of gear units 220 and 230 may be configured to transmit the rotational force of the knob 210 to the operation unit 230 or transmit the rotational force of a restoring unit 260 to be described later to the knob 210. In addition, the plurality of the gear units 220 and 230 may include a first gear unit 220 and a second gear unit 230. The knob 210 may be disposed on one side (e.g., an upper side) of the first gear unit 220, and the first gear unit 220 may be rotated with the knob 210 about the same rotational axis AX21 as the knob 210, when the knob 210 is rotated.

The knob 210 location may also include being disposed proximate to the upper side of the first gear unit 220 as well as being disposed adjacent to the upper side of the first gear unit 220. In addition, although the description will be given of the knob 210 and the first gear unit 220 formed separately and coupled to each other, the knob 210 and the first gear unit 220 may be configured integrally with each other, without being limited thereto.

Furthermore, the outer circumference of the first gear unit 220 may have a recessed shape and may be formed to be partitioned by a plurality of partition walls 220a. In particular, it may be possible to obtain an effect in which rigidity may be reinforced, while the weight of the first gear unit 220 may be reduced. When the knob 210 is rotated, the rotational force of the knob 210 may be transferred to the first gear unit 220, the rotational force of the first gear unit 220 may be transmitted to the second gear unit 230 disposed on the lower side of the first gear unit 220, and the rotational force transmitted to the second gear unit 230 may be transmitted to the operation unit 240 disposed on the lower side of the second gear unit 230.

In another exemplary embodiment of the present invention, the description will be given of the second gear unit 230 disposed on the lower side of the first gear unit 220 and the operation unit 240 disposed on the lower side of the second gear unit 230. However, it may also be possible to include the second gear unit 230 disposed proximate to the lower side of the first gear unit 220 as well as being disposed adjacent to the lower side of the first gear unit 220, and it may also be possible to include the operation unit 240 disposed proximate to the lower side of the second gear unit 230 as well as being disposed adjacent to the lower side of the second gear unit 230.

The second gear unit 230 may be formed with a cavity 231 (e.g., an aperture, a through-hole, etc.) into which the shaft 221 of the first gear unit 220 may be inserted, and may include a plurality of external gears 232 and 233 formed integrally to have the different diameters. The description will be given of the plurality of external gears 232 and 233 as an external gears formed to have different radii from the center of the cavity 231 of the second gear unit 230 as an example.

Hereinafter, in another exemplary embodiment of the present invention, the plurality of external gears 232 and 233 will be referred to as each of a first external gear 232 and a second internal gear 233. The first external gear 232 may be disposed to have a first side mesh with the first internal gear 222 formed on a second side (e.g., the lower side) of the first gear unit 220, and the second external gear 233 may be disposed with a first side that meshes with the second internal gear 241 formed on a first side (e.g., the upper side) of the operation unit 240. Therefore, when the knob 210 rotates, the first external gear 232 disposed to mesh with the first internal gear 222 of the first gear unit 220 may be configured to rotate and the second external gear 233 may be configured to rotate simultaneously. When the second external gear 233 rotates, the operation unit 240 may be rotated by the second internal gear 241 of the operation unit 240 disposed to mesh with the second external gear 233.

Moreover, in another exemplary embodiment of the present invention, the central axis Ax22 of the first external gear 232 and the second external gear 233 may be spaced apart from the rotational axis AX21 of the knob 210 in one direction, the diameter of the first external gear 232 may be less than the diameter d21 of the first internal gear 222 of the first gear unit 220, and the diameter of the second external gear 233 may be less than the diameter d22 of the second internal gear 241 of the operation unit 240. Accordingly, the present invention may be advantageous for miniaturization (e.g., reducing overall size), while achieving the sufficient reduction effects, by allowing the first external gear 232 and the second external gear 233 to rotate about the rotational axis AX21 of the knob 210 and to rotate about the central axis Ax22, thereby achieving a high gear ratio even without increasing the difference in diameters of the gears meshing with each other.

Figure 29:
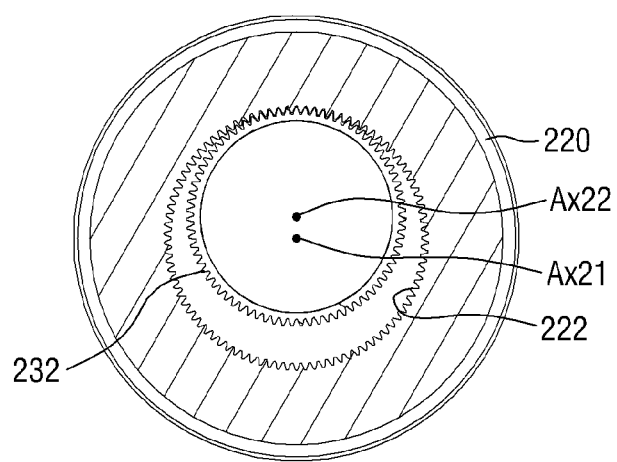
Figure 30:
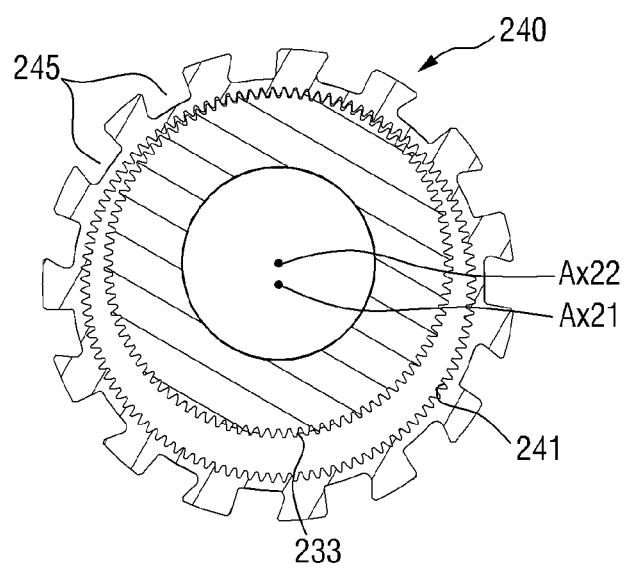

In other words, the second gear unit 230 may be disposed with a first side of the first external gear 232 meshing with the first internal gear 222 of the first gear unit 220 as illustrated in FIG. 29, a second side of the external gear 232 may be spaced apart from the first internal gear 222 of the first gear unit 220, and when a first side of the second external gear 233 meshes with the second internal gear 241 of the operation unit 240 as illustrated in FIG. 30, the second side of the second external gear 233 may be spaced apart from the second internal gear 241 of the operation unit 240. Thus, the first external gear 232 and the second external gear 233 may be configured to rotate about the rotational axis AX21 of the knob 210 and rotate about the central center axis Ax22, to thus obtain the reduction effect.

Furthermore, a plurality of detent grooves 243 may be disposed on the second side (e.g., the lower side) of the operation unit 240 along the periphery of the cavity 242 of the operation unit 240, and the operation feeling may be generated by the catching member 244 that is caught or stopped by the plurality of detent grooves 243 when the operation unit 240 rotates. The catching member 244 may be connected to the second end of the elastic member 244b with a first end fixed to the support member 244a, and since the catching member 244 may be elastically supported by the elastic member 244b, the catching member 244 may be maintained in contact with the plurality of detent grooves 243, and the operation feeling may be generated when the operation unit 240 rotates.

Although the description will be given of the elastic member 244b formed as a leaf spring or the like in another exemplary embodiment of the present invention as an example, the elastic member 244b may have various shapes capable of elastically supporting the catching member 244, without being limited thereto. Furthermore, in another exemplary embodiment of the present invention, the plurality of detent grooves 243 may be disposed to have a smaller diameter than the operation unit 240 around the cavity 242 of the operation unit 240. Even in this case, since the catching member 244 may be maintained in contact with the plurality of detent grooves 243 by an elastic member 244b such as a leaf spring, the weight and size may be reduced.

Additionally, a plurality of fixing grooves 245 may be formed on the outer circumference of the operation unit 240, such a plurality of fixing grooves 245 may be used to restrain the rotation of the operation unit 240 or release the restraint thereof, and the detailed description thereof will be provided later. Meanwhile, a detection unit 250 configured to detect the shift stage selected by the rotation of the knob 210 may be disposed on one side of the shaft 221 of the first gear unit 220. The shaft 221 of the first gear unit 220 may be disposed through the cavity 221 of the second gear unit 220 and the cavity 242 of the operation unit 240. The detection unit 250 may include a gear 251 including a magnet 251a on one side and may be disposed to mesh with the shaft gear 221a formed on the shaft 221 of the first gear unit 220, and a sensor 252 such as a hole sensor configured to detect a change in the magnetic force caused by the turning of the gear 251.

Although the description will be given of detecting the shift stage using a change in the magnetic force based on the position of the magnet 251a in another exemplary embodiment of the present invention as an example, it may be possible to detect the shift stage through various methods such as detection of the shift stage by detecting the number of slits passing between the light-receiving element and the light-emitting element, without being limited thereto.

The restoring unit 260 may be configured to restore the knob 210 to the preset shift stage, when the preset restoring conditions are satisfied to prevent problems when operating the vehicle in the future, even when the driver separately restores the shift stage, by restoring the knob 210 to the preset shift stage when the startup of the vehicle is turned off or there is another operation command. In addition, the restoring unit 260 may be configured to restore the knob 210 to the parking stage when the restoring conditions from the non-parking condition to the parking condition are satisfied, or may be configured to restore the knob 210 to the previous shift stage when an erroneous operation of the knob 210 occurs, in the same manner as in the above-described embodiments.

Additionally, the restoring unit 260 may include a third gear unit 261 and a drive unit 262. The third gear unit 261 may be rotated by the drive unit 262, and may be formed with a cavity 261a into which the shaft 221 of the first gear unit 220 may be inserted. An insertion protrusion 261b may be formed on one side of the third gear unit 261. The insertion protrusion 261b may be connected to the cavity 242 of the operation unit 240 and may be inserted into the cavity 231 of the second gear unit 230. A central axis Ax22 of the insertion protrusion 261b may be spaced apart from the rotational axis AX21 of the knob 210 in one direction, similarly to the central axis Ax22 of the second gear unit 230, i.e., the first gear 232 and the second gear 233. A worm gear 262a may be disposed in the rotational shaft of the drive unit 262, and a reduction gear 263 adapted to perform the reduction based on the reduction ratio of the input shaft gear 263a and the output shaft gear 263b may be disposed between the third gear unit 261 and the worm gear 262a to obtain a reduction effect.

In the restoring unit 260, since the center axis Ax22 of the insertion protrusion 261b of the third gear unit 261 inserted into the cavity 231 of the second gear unit 230 may be spaced apart from the rotational axis AX21 of the knob 210, the second gear unit 230 may be configured to receive force in the outward direction based on the rotational axis AX21 of the knob 210 during rotation of the third gear unit 261. Thus, the second gear unit 230 may be configured to rotate about the rotational axis Ax21 of the knob 210 and rotate about the central axis Ax22.

Accordingly, when the second gear unit 230 is rotated by the drive unit 262 of the restoring unit 260, the knob 210 coupled to the first gear unit 220 may be configured to rotate. However, in another exemplary embodiment of the present invention, since the second gear unit 230 rotates about the rotational axis AX21 of the knob 210 and rotates about the central axis Ax22, the speed reduction effect may be obtained, and it may be advantageous for miniaturization as compared to using the diameter of substantial differences to obtain a high gear ratio.

Further, when the knob 210 is restored to the preset shift stage by the restoring unit 260, the startup of the vehicle may be turned off or there is another operation command, and an occurrence of the operation feeling is not required. Thus, the locking unit 260 may be configured to restrain the rotation of the operation unit 220 and prevent an occurrence of unnecessary operation feeling to reduce the noise.

The locking unit 270 may include a drive unit 271 and a locking member 272. In particular, the drive unit 271 of the locking unit 270 may be a bidirectional solenoid as in the above-described exemplary embodiments and may include a moving rod 271a configured to move linearly. The locking member 272 may be connected to a first end of the moving rod 271a and may be rotated about the rotation shaft 272a during the movement of the moving rod 271a. Thus, when one side of the locking member 272 is inserted into any one of the plurality of fixing grooves 245, the locking member 272 may be configured to restrain the rotation of the operation unit 240, and in contrast, when one side of the locking member 242 is disengaged from the plurality of fixing grooves 245, the locking member 272 may be configured to release the restraint of the rotation of the operation unit 240.

Figure 31:
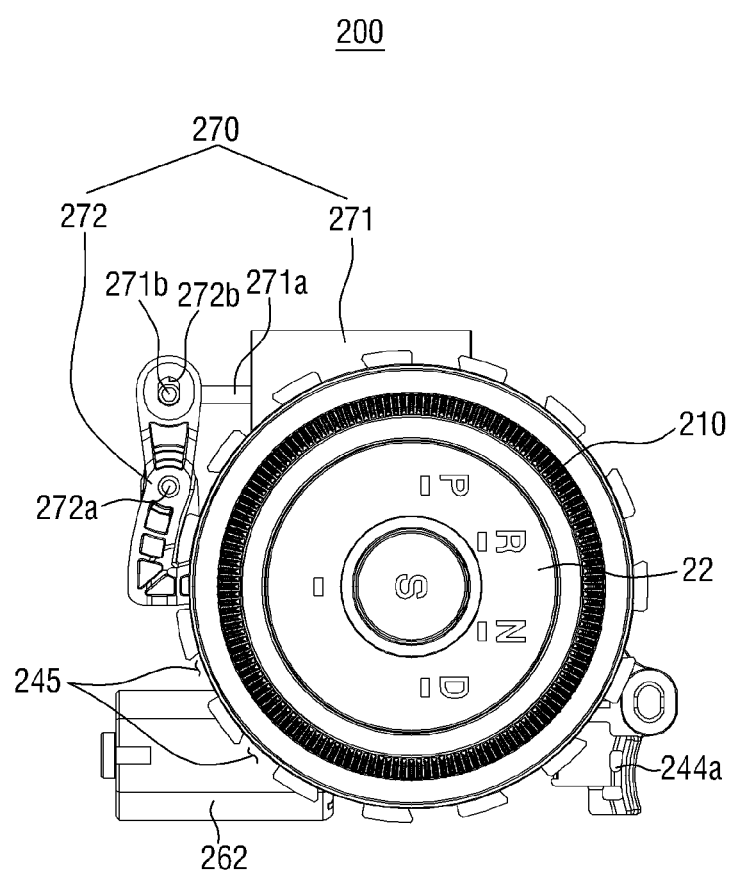
FIGS. 31 and 32 are plan views illustrating the vehicle transmission according to another exemplary embodiment of the present invention.
Figure 32:
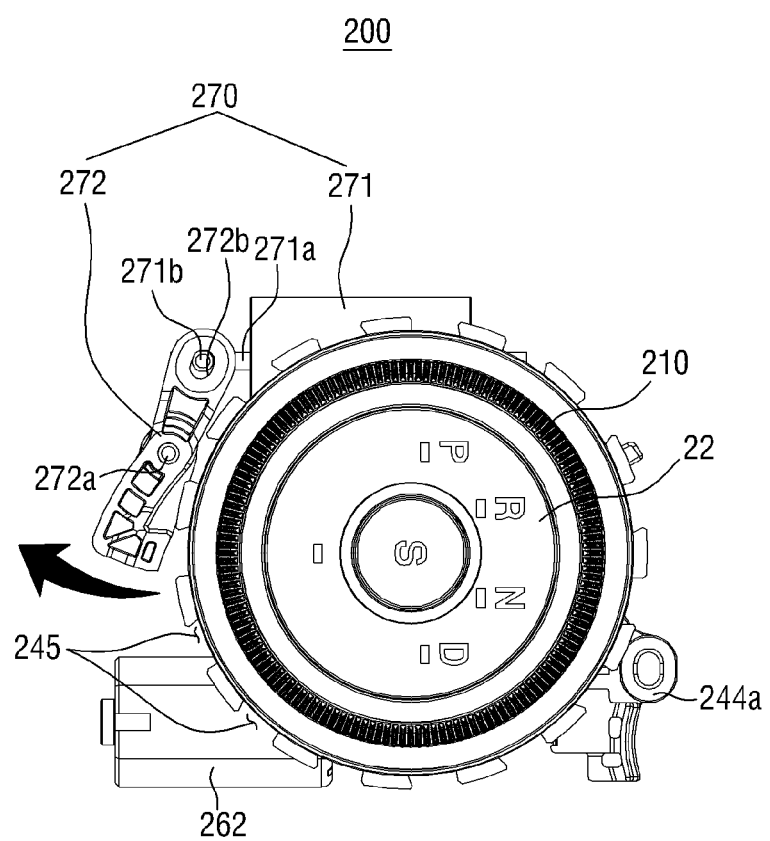

An insertion protrusion 271b inserted into the insertion groove 272b formed in the locking member 272 may be connected to a first end of the moving rod 271a. As the moving rod 271a is moved, the insertion protrusion 271b flows inside the insertion groove 272b, and the linear movement of the moving rod 271a may be converted into the rotational movement of the locking rod 272. In other words, when attempting to constrain the rotation of the operation unit 240, the locking unit 270 may be disposed with a first side of the locking member 272 inserted into one of the plurality of fixing grooves 245 as illustrated in FIG. 31. However, when releasing the restrain of the rotation of the operation unit 240, while the locking member 272 is rotated in an opposite direction of FIG. 31, the position thereof may change and one side of the locking member 272 may be disengaged from the plurality of fixing grooves 245 as in FIG. 32, thereby making it possible to release the restraint of the rotation of the operation unit 240.

Further, in another exemplary embodiment of the present invention, the description will be given of the drive unit 271 of the locking unit 270 being a bidirectional solenoid similar to above-described FIGS. 12 through 14 in which the power may be supplied during movement of the moving rod 271a, and after the movement of the moving rod 271a is completed, even when the power supply is stopped, the moving rod 271a may be maintained at the current position without being restored to the previous position.

As described above, the vehicle transmission 1 of the present invention may be reduced in size, while achieving a high gear ratio, by allowing the gear units configured to rotate about the axes different from the rotational axes AX11 and AX21 of the knobs 110 and 210 to rotate in the state of meshing with each other.

While the present invention has been particularly illustrated and described with reference to exemplary embodiments thereof, it will be understood by those of ordinary skill in the art that various changes in form and detail may be made therein without departing from the spirit and scope of the present invention as defined by the following claims.

The exemplary embodiments should be considered in a descriptive sense only and not for purposes of limitation.

What is claimed is:

1. A vehicle transmission, comprising:
a knob configured to rotate to select a shift stage;
an operation unit configured to rotate during rotation of the knob to generate a tactile response when rotated;
a plurality of gear units configured to transmit a rotational force of the knob to the operation unit, and
a case that accommodates the operation unit and the plurality of gear units disposed therewithin and the knob disposed on one side thereof,
wherein at least one of the plurality of the gear units includes a first external gear that has a central axis eccentrically spaced apart from a rotational axis of the knob and a second external gear that has the central axis same as the first external, and
wherein the rotational axis of the knob is fixed with respect to the case, and the central axis of the first external gear and the second external gear is configured to revolve around the rotational axis of the knob.

2. The vehicle transmission of claim 1, wherein the plurality of the gear units include a first gear unit configured to rotate about the same center axis as the rotational axis of the knob; and a second gear unit disposed to mesh with the first gear unit and having the central axis eccentrically spaced apart from the rotational axis of the knob.

3. The vehicle transmission of claim 2, wherein the first gear unit includes a first internal gear formed along an outer end; and a shaft inserted into a cavity of the second gear unit.

4. The vehicle transmission of claim 3, wherein the first external gear of the second gear unit is disposed to mesh with a first side of the first internal gear; and the second external gear of the second gear unit is disposed to mesh with a first side of a second internal gear formed in the operation unit.

5. The vehicle transmission of claim 4, wherein the second gear unit is configured to transmit the rotational force, which is transmitted to the first external gear of the second gear unit by rotation of the knob, to the operation unit through the second external gear of the second gear unit.

6. The vehicle transmission of claim 4, wherein the first external gear meshes with the first side of the first internal gear and is spaced apart from a second side thereof, and the second external gear meshes with the first side of the second internal gear and is spaced apart from a second side thereof.

7. The vehicle transmission of claim 2, wherein the knob and the operation unit are disposed on the upper side of the first gear unit, and the second gear unit is disposed on the lower side of the first gear unit.

8. The vehicle transmission of claim 2, wherein the knob is disposed on the upper side of the first gear unit, and the operation unit and the second gear unit are disposed on the lower side of the first gear unit.

9. The vehicle transmission of claim 2, wherein the central axis of the second gear unit is configured to revolve around the rotational axis of the knob and rotate about the central axis spaced from the rotational axis of the knob.

10. The vehicle transmission of claim 1, further comprising:
a restoring unit configured to restore the knob to a preset shift stage when a preset restoring condition is satisfied.

11. The vehicle transmission of claim 10, wherein the restoring unit includes:
a drive unit; and
a third gear unit that allows the at least one of the plurality of gear units having the central axis eccentrically spaced apart from the rotational axis to revolve around the rotational axis of the knob while rotating about the central axis, wherein the third gear unit is configured to be turned by the drive unit.

12. The vehicle transmission of claim 11, wherein the drive unit is a bidirectional solenoid.

13. The vehicle transmission of claim 1, further comprising:
a locking unit configured to restrain rotation of the operation unit or release the restraint.

14. The vehicle transmission of claim 13, wherein the locking unit includes:
a drive unit; and
a locking member inserted into one of a plurality of fixing grooves formed along an outer circumference of the operation unit.

15. The vehicle transmission of claim 14, wherein the locking member has a rotational axis perpendicular or horizontal to the rotational axis of the knob.

16. A vehicle transmission, comprising:
a knob configured to rotate to select a shift stage;
a plurality of gear units configured to transmit a rotational force of the knob; and
a case that accommodates the plurality of gear units disposed therewithin and the knob disposed on one side thereof,
wherein the plurality of the gear units includes:
a first gear unit configured to rotate about a rotational axis of the knob; and
a second gear unit disposed to mesh with the first gear unit and configured to rotate about a central axis eccentrically spaced from the rotational axis of the knob, and
wherein the rotational axis of the knob is fixed with respect to the case, and the central axis of the second gear unit is configured to revolve around the rotational axis of the knob.

17. The vehicle transmission of claim 16, wherein the first gear unit includes a first internal gear formed along an outer end; and a shaft inserted into a cavity of the second gear unit.

18. The vehicle transmission of claim 17, further comprising:
an operation unit configured to rotate to generate a tactile response during rotation of the second gear unit.

19. The vehicle transmission of claim 18, wherein the second gear unit includes a first external gear that meshes with a first side of the first internal gear and is spaced apart from a second side thereof; and a second external gear that meshes with a first side of a second internal gear formed in the operation unit and is spaced apart from a second side thereof.

20. The vehicle transmission of claim 16, further comprising:
a restoring unit configured to restore the knob to a preset shift stage when a preset restoring condition is satisfied,
wherein the second gear unit is configured to revolve around the rotational axis of the knob while rotating about the central axis, and
wherein the second gear unit is configured to be operated by the restoring unit.

* * * * *